United States Patent
Morita et al.

(10) Patent No.: US 12,480,838 B2
(45) Date of Patent: Nov. 25, 2025

(54) MEASURING DEVICE, MEASURING METHOD, AND ELECTRONIC DEVICE

(71) Applicant: SONY GROUP CORPORATION, Tokyo (JP)

(72) Inventors: Hiroshi Morita, Tokyo (JP); Yusuke Oyama, Tokyo (JP); Kazuaki Toba, Tokyo (JP); Masanari Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 181 days.

(21) Appl. No.: 18/264,206

(22) PCT Filed: Jan. 14, 2022

(86) PCT No.: PCT/JP2022/001091
§ 371 (c)(1),
(2) Date: Aug. 3, 2023

(87) PCT Pub. No.: WO2022/176463
PCT Pub. Date: Aug. 25, 2022

(65) Prior Publication Data
US 2024/0035923 A1 Feb. 1, 2024

(30) Foreign Application Priority Data
Feb. 18, 2021 (JP) .................. 2021-024450

(51) Int. Cl.
*G01M 11/02* (2006.01)
*H04B 10/80* (2013.01)

(52) U.S. Cl.
CPC ......... *G01M 11/0207* (2013.01); *H04B 10/80* (2013.01)

(58) Field of Classification Search
CPC .......... G01M 11/0207; G01M 11/088; G01M 11/335; H04B 10/80; H04B 10/079;
(Continued)

(56) References Cited

U.S. PATENT DOCUMENTS 11,101,886 B1 * 8/2021 Liu .................. H04B 10/272
2016/0356670 A1 * 12/2016 Brillhart .......... H04B 10/07955
2021/0068899 A1 * 3/2021 Nomura ................. G01M 11/31

FOREIGN PATENT DOCUMENTS

JP 2008-249471 A 10/2008
JP 2009-300373 A 12/2009
(Continued)

OTHER PUBLICATIONS

JP6220764B2 translation (Year: 2017).*
(Continued)

*Primary Examiner* — Tarifur R Chowdhury
*Assistant Examiner* — Carlos Perez-Guzman
(74) *Attorney, Agent, or Firm* — CHIP LAW GROUP

(57) ABSTRACT

Provided is an apparatus to properly measure the bending amount of an optical waveguide routed in an electronic device or the like. An optical signal outputted with a second wavelength from the optical waveguide is received by a light receiving unit. In this case, the optical waveguide allows propagation only in a basic mode at a first wavelength and the second wavelength is a wavelength where the optical waveguide allows propagation at least in a primary mode in addition to a basic mode. The bending amount of the optical waveguide is obtained by a processing unit on the basis of the amount of a primary mode component included in the optical signal with the second wavelength.

16 Claims, 24 Drawing Sheets

(58) Field of Classification Search
CPC . G01B 11/18; H04J 14/04; G02B 6/32; G02B 6/42
See application file for complete search history.

(56) References Cited

FOREIGN PATENT DOCUMENTS

| | | | |
|---|---|---|---|
| JP | 2015-152399 | A | 8/2015 |
| JP | 2016-099166 | A | 5/2016 |
| JP | 2017-003581 | A | 1/2017 |
| JP | 6220764 | B2 * | 10/2017 |
| WO | 2020/153236 | A1 | 7/2020 |

OTHER PUBLICATIONS

International Search Report and Written Opinion of PCT Application No. PCT/JP2022/001091, issued on Apr. 12, 2022, 11 pages of ISRWO.
Nakamura, et al."Loss Cause Identification by Evaluating Backscattered Modal Loss Ratio Obtained With 1-μM-Band and Mode-Detection", OTDR. Journal of Lightwave Technology, vol. 34, No. 15, Aug. 1, 2016, pp. 3568-3576.

* cited by examiner

PROPAGATED LIGHT : 1310nm
WAVELENGTH
CORE DIAMETER : 8um
NA : 0.1

BASIC MODE

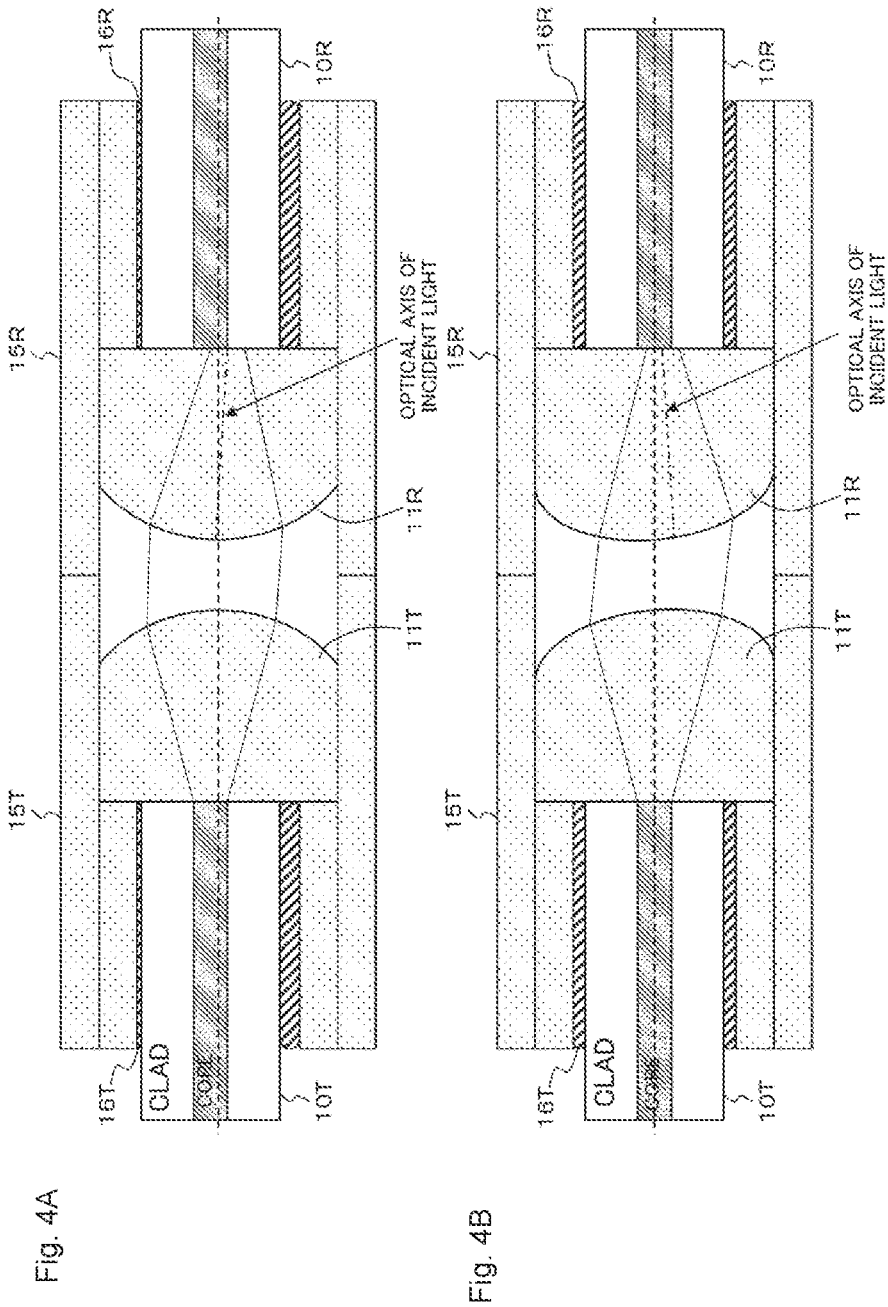

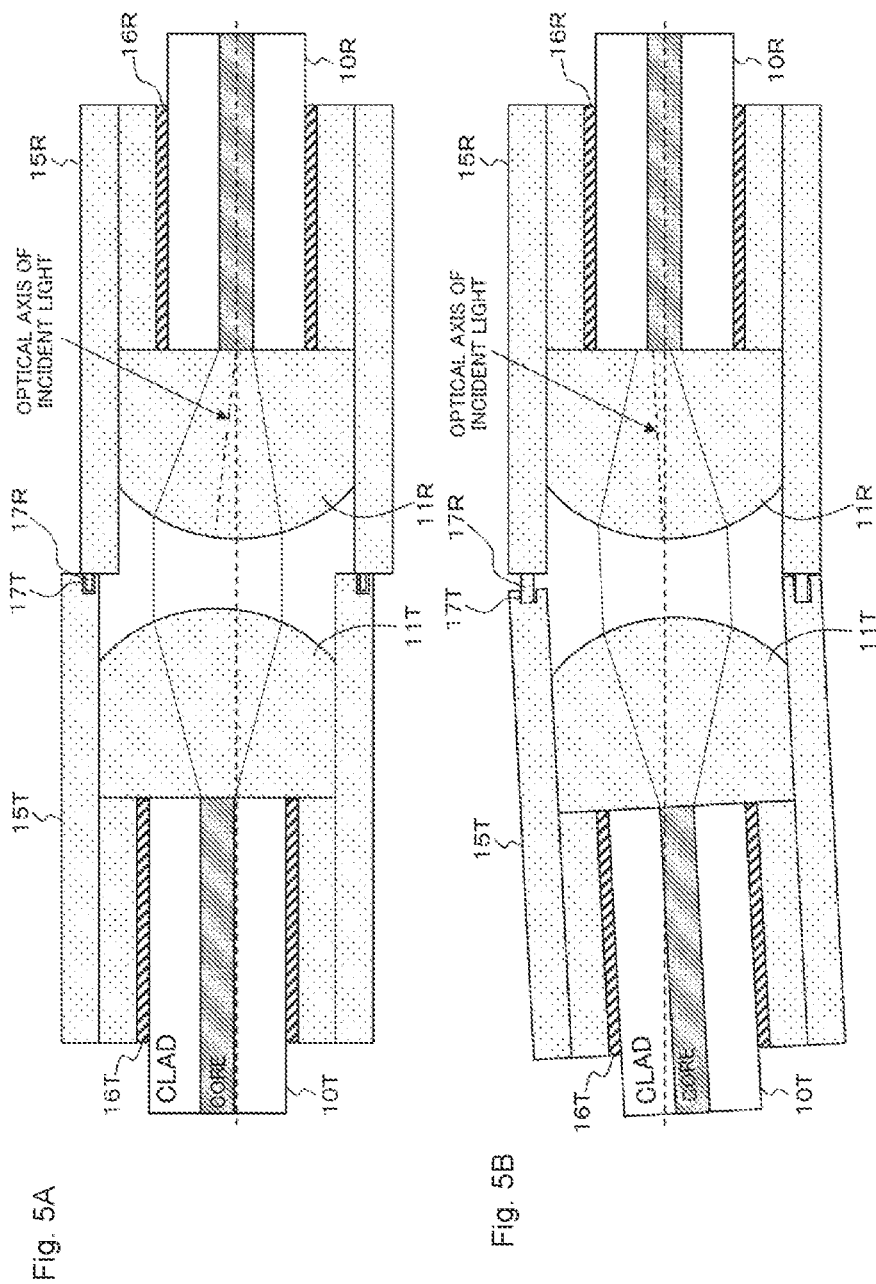

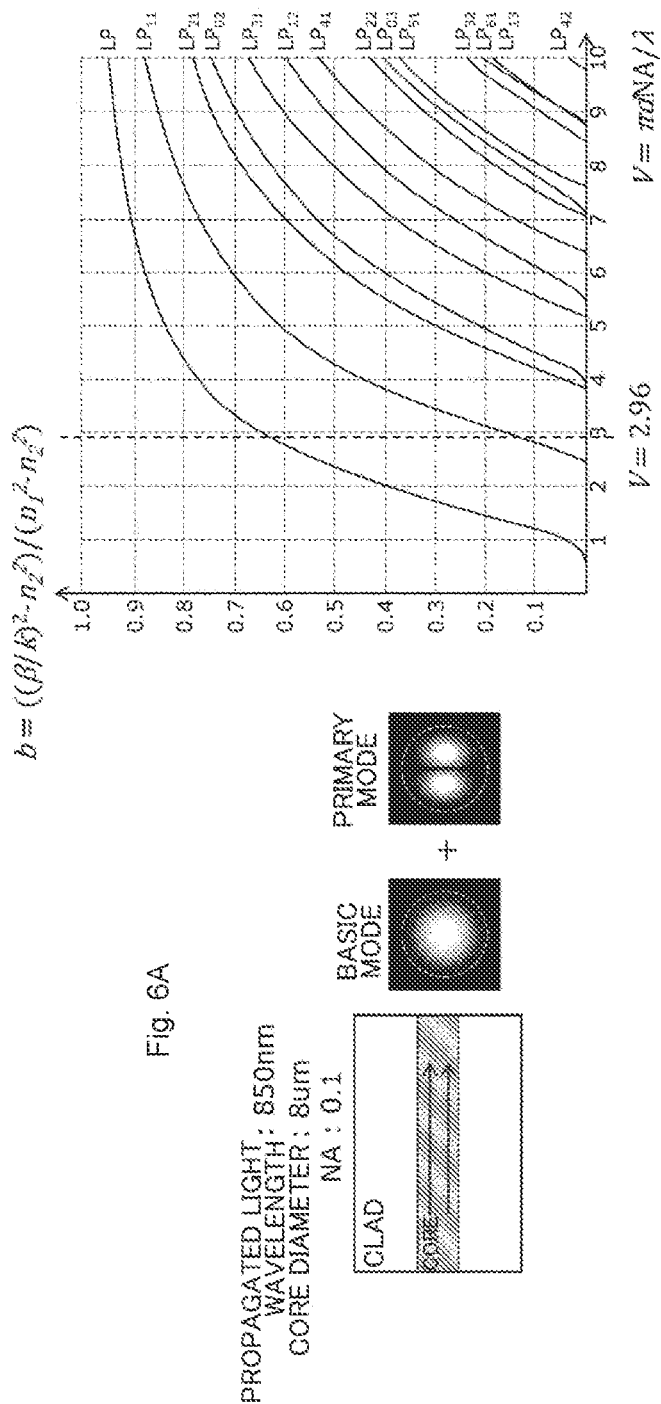

MEASURING DEVICE, MEASURING METHOD, AND ELECTRONIC DEVICE

CROSS REFERENCE TO RELATED APPLICATIONS

This application is a U.S. National Phase of International Patent Application No. PCT/JP2022/001091 filed on Jan. 14, 2022, which claims priority benefit of Japanese Patent Application No. JP 2021-024450 filed in the Japan Patent Office on Feb. 18, 2021. Each of the above-referenced applications is hereby incorporated herein by reference in its entirety.

TECHNICAL FIELD

The present technique relates to a measuring device, a measuring method, and an electronic device and specifically relates to a measuring device or the like for obtaining a bending amount of an optical waveguide.

BACKGROUND ART

A transmitting/receiving system including electronic devices connected via an optical fiber is known. In the electronic device, for example, the optical fiber serving as an optical waveguide is routed between, for example, an optical connector and a processor. In this case, if the optical fiber is routed while placing a high priority on design flexibility, a sharply bent portion may affect the quality of a distributed item and interfere with communications in some cases.

The present applicant proposed a communication device capable of cost reduction by relaxing the accuracy of a displacement (see PTL 1). The communication device includes an optical waveguide that allows propagation only in a basic mode at a first wavelength and is configured to perform communications using light with a second wavelength where the optical waveguide allows propagation at least in a primary mode in addition to the basic mode.

CITATION LIST

Patent Literature

[PTL 1] WO 2020/153236

SUMMARY

Technical Problem

An object of the present technique is to properly measure the bending amount of an optical waveguide routed in an electronic device or the like.

Solution to Problem

A concept of the present technique is represented by a measuring device including: a light receiving unit that receives an optical signal outputted with a second wavelength from an optical waveguide,
wherein the optical waveguide allows propagation only in a basic mode at a first wavelength, and
the second wavelength is a wavelength where the optical waveguide allows propagation at least in a primary mode in addition to the basic mode,
the measuring device further including a processing unit that performs processing for obtaining a bending amount of the optical waveguide on the basis of the amount of a component of the primary mode, the component being included in the optical signal with the second wavelength.

In the present technique, the optical signal outputted with the second wavelength from the optical waveguide is received by the light receiving unit. In this case, the optical waveguide allows propagation only in the basic mode at the first wavelength and the second wavelength is a wavelength where the optical waveguide allows propagation at least in the primary mode in addition to the basic mode.

The bending amount of the optical waveguide is obtained by the processing unit on the basis of the amount of the primary mode component included in the optical signal with the second wavelength. For example, the processing unit obtains the bending amount of the optical waveguide by using the ratio of the amount of the primary mode component included in the optical signal with the second wavelength and the amount of the basic mode component included in the optical signal with the second wavelength. In this case, regardless of the power of the optical signal inputted to the optical waveguide, and thus even if the power of the optical signal inputted to the optical waveguide is not determined, the bending amount of the optical waveguide can be obtained.

For example, the processing unit may include: a mode separation unit that separates the primary mode component and the basic mode component from the second wavelength; a first electric conversion unit that converts the primary mode component into an electric signal, the primary mode component being separated by the mode separation unit; a second electric conversion unit that converts the basic mode component into an electric signal, the basic mode component being separated by the mode separation unit; an arithmetic unit that determines the level ratio of the output of the first electric conversion unit and the output of the second electric conversion unit as the ratio of the amount of the primary mode component and the amount of the basic mode component; and a conversion unit that converts the ratio determined by the arithmetic unit into a bending amount of the optical waveguide on the basis of relationship information about the bending amount of the optical waveguide and the ratio of the amount of the primary mode component and the amount of the basic mode component. The processing unit is configured thus, thereby properly obtaining the bending amount of the optical wavelength.

For example, the processing unit may be configured to start processing at the start of the reception of the optical signal with the second wavelength to the light receiving unit. In this case, for example, the processing unit may be configured to terminate the processing when the light receiving unit terminates the reception of the optical signal with the second wavelength. The processing unit starts or terminates the processing in this manner, allowing the processing unit to operate efficiently and obtain lower power consumption.

In this case, for example, a light transmitting unit that inputs, to the optical waveguide, an optical signal indicating start may be further provided. Thus, the start of the input of the optical signal with the second wavelength to the other end of the optical waveguide can be accelerated. For example, the light transmitting unit may be configured to start inputting the optical signal indicating the start, to the optical waveguide on the basis of a user instruction operation.

In this case, for example, the light transmitting unit may be configured to terminate the input of the optical signal indicating the start to the optical waveguide when the light receiving unit starts receiving the optical signal with the second wavelength. Thus, the optical signal indicating start can be prevented from being excessively inputted from the light transmitting unit to the optical waveguide, thereby reducing power consumption.

In this case, for example, the light transmitting unit may be configured to further input, to the optical waveguide, an optical signal indicating termination when the processing of the processing unit is terminated in a state in which the light receiving unit has received the optical signal with the second wavelength. Thus, the termination of the input of the optical signal with the second wavelength to the other end of the optical waveguide can be accelerated. For example, the processing unit may be configured to terminate processing automatically at the completion of the series of operations or on the basis of a user instruction operation.

As described above, in the present technique, the bending amount of the optical waveguide is obtained on the basis of the amount of the primary mode component included in the optical signal with the second wavelength where the optical waveguide allows propagation at least in the primary mode in addition to the basic mode, the optical signal being outputted from the optical waveguide that allows propagation only in the basic mode at the first wavelength. This can properly measure the bending amount of the optical waveguide routed in the electronic device.

In the present technique, a determination unit may be provided to determine the appropriateness of the routing of the optical waveguide on the basis of the bending amount of the optical waveguide, the bending amount being obtained by the processing unit. For example, the determination unit may be configured to determine the appropriateness of the routing of the optical waveguide on the basis of whether the bending amount of the optical waveguide is equal to or larger than a bending amount with a certain margin from a bending amount that rapidly reduces coupling efficiency, the processing unit obtaining the bending amount of the optical waveguide. Thus, the appropriateness of the routing of the optical waveguide can be determined and the determination result can be provided to a user.

In this case, a display unit may be provided to display information including the determination result of the determination unit. With this configuration, the user can easily identify the determination result or the like on the appropriateness of the routing of the optical waveguide on the basis of the display of the display unit. In this case, for example, the information may include the bending amount of the optical waveguide and the bending margin of the optical waveguide, the bending amount being obtained by the processing unit. Thus, the user can easily identify the bending amount of the optical waveguide and the bending margin of the optical waveguide.

Additionally, another concept of the present technique is an electronic device including
an optical connector,
wherein one end of an optical waveguide is connected to the optical connector, and the optical waveguide is configured to
allow propagation only in a basic mode at a first wavelength and
perform communications using light with a second wavelength where the optical waveguide allows propagation at least in a primary mode in addition to the basic mode, the electronic device further including a light transmitting unit that inputs an optical signal having only the basic mode with the second wavelength to the other end of the optical waveguide.

In the electronic device of the present technique, an optical connector is provided and one end of the optical waveguide is connected to the optical connector. The optical waveguide allows propagation only in the basic mode at the first wavelength and is configured to perform communications using light with the second wavelength where the optical waveguide allows propagation at least in the primary mode in addition to the basic mode. The optical signal having only the basic mode with the second wavelength is inputted to the other end of the optical waveguide by the light transmitting unit.

For example, the light transmitting unit may start inputting the optical signal having only the basic mode with the second wavelength to the other end of the optical waveguide on the basis of a user instruction operation. In this case, for example, the light transmitting unit may terminate the input of the optical signal having only the basic mode with the second wavelength to the other end of the optical waveguide on the basis of a user instruction operation.

For example, the light transmitting unit may be configured to start inputting the optical signal having only the basic mode with the second wavelength to the other end of the optical waveguide when an optical signal indicating start is outputted from the other end of the optical waveguide. In this case, for example, the light transmitting unit may be configured to terminate the input of the optical signal having only the basic mode with the second wavelength to the other end of the optical waveguide when an optical signal indicating termination is outputted from the other end of the optical waveguide.

As described above, in the present technique, the optical signal having only the basic mode with the second wavelength is inputted to the other end of the optical waveguide. The optical signal outputted with the second wavelength from one end of the optical waveguide includes an amount of the primary mode component according to the bending amount of the optical waveguide. Thus, the bending amount of the optical waveguide can be properly measured on the basis of the amount of the primary mode component and the appropriateness of the routing of the optical waveguide can be determined from the bending amount.

BRIEF DESCRIPTION OF DRAWINGS

FIGS. 2A and 2B illustrate the basic structure of an optical fiber and the LPml mode of a step-index optical fiber.
[FIGS. 4A and 4B]
FIGS. 4A and 4B illustrate an example of optical communications through space coupling.
[FIGS. 5A and 5B]
FIGS. 5A and 5B illustrate an example of optical communications through space coupling.
[FIGS. 6A and 6B]
FIGS. 6A and 6B are explanatory drawings showing that the basic mode of LP01 and the primary mode of LP11 can be present when light with a wavelength of 850 nm is inputted to a 1310-nm single-mode fiber.

FIGS. 7A and 7B show that optical axis misalignment occurs on condition that only the basic mode of LP01 is present for input light.

FIG. 8 is a graph indicating the simulation result of a loss amount when input light has wavelengths of 1310 nm and 850 nm.

FIGS. 9A and 9B show that only the basic mode is present for input light in the absence of optical axis misalignment while the basic mode is partially converted into the primary mode in the presence of optical axis misalignment.

FIG. 10 is a graph for explaining the conversion of the basic mode into the primary mode according to a displacement.

FIGS. 11A and 11B show the simulation result of coupling efficiency of optical power with respect to a curvature radius R of the optical fiber.

FIG. 12 shows the simulation result of coupling efficiency of optical power with respect to the curvature radius R of the optical fiber and the simulation result of coupling efficiency of the basic mode and primary mode in a separated manner.

FIGS. 13A and 13B are explanatory drawings of the reason why a bend of the optical fiber causes the primary mode.

FIG. 14 illustrates an example of the routing of the optical fiber in an electronic device.

FIG. 15 is an enlarged view showing the vertical axis of the coupling efficiency of the primary mode.

FIG. 16 illustrates a system example in which the bending amount of the optical fiber routed in the electronic device is measured by a measuring device according to a first embodiment.

FIG. 17 shows a simulation result indicating the ratio of an amount of the primary mode component and an amount of the basic mode component (the ratio of primary mode coupling efficiency/basic mode coupling efficiency) with respect to a curvature radius R.

FIG. 18 is an enlarged view of the range of 0 to 0.2 on the vertical axis of a simulation result indicating the ratio of an amount of the primary mode component and an amount of the basic mode component (the ratio of primary mode coupling efficiency/basic mode coupling efficiency) with respect to a curvature radius R.

FIG. 19 illustrates a display example of information including a determination result indicating the appropriateness of the routing of the optical fiber on a display unit.

FIG. 20 is a flowchart showing an example of steps for the test mode in the electronic device and steps in the measuring device.

FIG. 21 illustrates a system example in which the bending amount of an optical fiber routed in an electronic device is measured by a measuring device according to a second embodiment.

FIGS. 22A and 22B are explanatory drawings of a wavelength selection filter in the electronic device and from an aspect.

DESCRIPTION OF EMBODIMENTS

A mode for carrying out the present invention (hereinafter referred to as "embodiment") will be described below. The descriptions will be provided in the following order.

1. Embodiment
2. Modification Example

1. Embodiment

[Basic Description about Present Technique]

Figure 1:
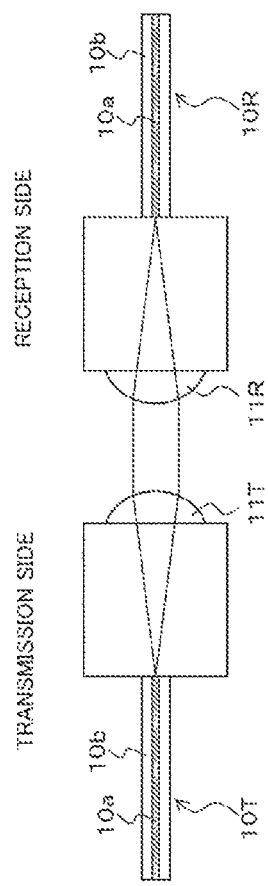
FIG. 1 illustrates the outline of optical communications through space coupling.

First, a technique related to the present technique will be described below. FIG. 1 illustrates the outline of optical communications through space coupling. In this case, light emitted from an optical fiber 10T on the transmission side is emitted in the shape of a collimated light beam through a lens 11T. The collimated light beam is then condensed through a lens 11R on the reception side and is emitted into an optical fiber 10R. In the case of such optical communications, a displacement causes a large loss of optical power particularly in a single-mode fiber. The optical fibers 10T and 10R each have a double structure including a core 10a at a central portion serving as an optical path and a clad 10b surrounding the core 10a.

A basic concept regarding modes will be described below. In the case of propagation through the optical fiber in a single mode, parameters including a refractive index and a core diameter of the fiber need to be determined such that only a single mode is present.

Figure 2A:
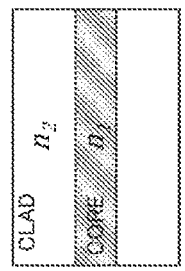
[FIGS. 2A and 2B]

FIG. 2A illustrates the basic structure of the optical fiber. The optical fiber has a structure in which a central portion called a core is covered with a layer called a clad. In this case, a refractive index n1 of the core is set high, whereas a refractive index n2 of the clad is set low. Light propagates while being trapped in the core.

Figure 2B:
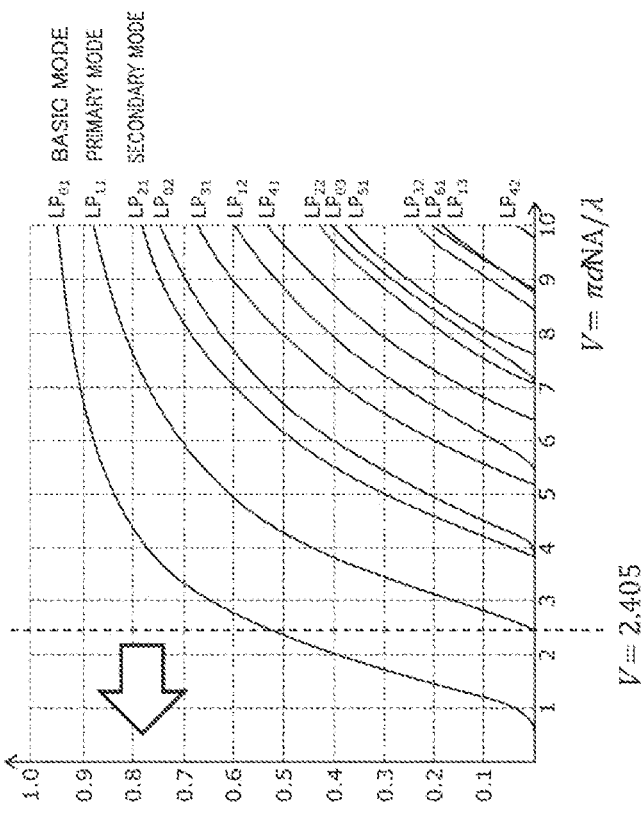

FIG. 2B indicates an Lpml (Linearly Polarized) mode of a step-index optical fiber and a normalized propagation constant b as the function of a normalized frequency V. The vertical axis indicates the normalized propagation constant b. In the absence (interruption) of propagation in a certain mode, b=0 is determined. b approached 1 as optical power is trapped (propagated) in the core. The horizontal axis indicates the normalized frequency V expressed by formula (1) below. Here, d is a core diameter, NA is a numerical aperture, and A is a wavelength of light.

$$V=\pi d NA/\lambda \ldots (1)$$

For example, LP11 is interrupted when V=2.405 is determined, so that only the mode of LP01 is present. Thus, the single mode is present at V=2.405 or lower. In this case, LP01 is a basic mode (0-th mode) and subsequent LP11, LP21, . . . are denoted as a primary mode, a secondary mode, and the like.

Figure 3A:
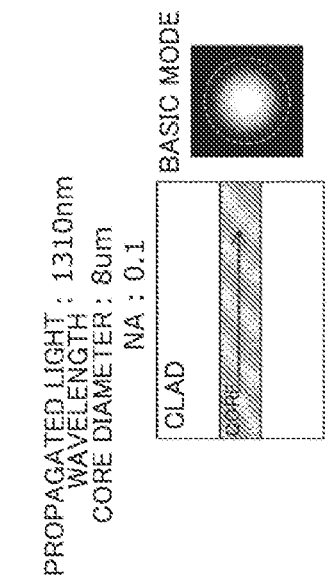
[FIGS. 3A and 3B]
FIGS. 3A and 3B indicate a normalized frequency V in an ordinary case of 1310 nm in a single mode.

For example, as illustrated in FIG. 3A, it is assumed that the normalized frequency V is determined in an ordinary case of 1310 nm in the single mode. If the core diameter d and the numerical aperture NA are set at d=8 μm and NA =0.1 that are typical parameters of a 1310-nm optical fiber and light propagates through the fiber at a wavelength of 1310 nm, V=1.92 is obtained from formula (1).

Figure 3B:
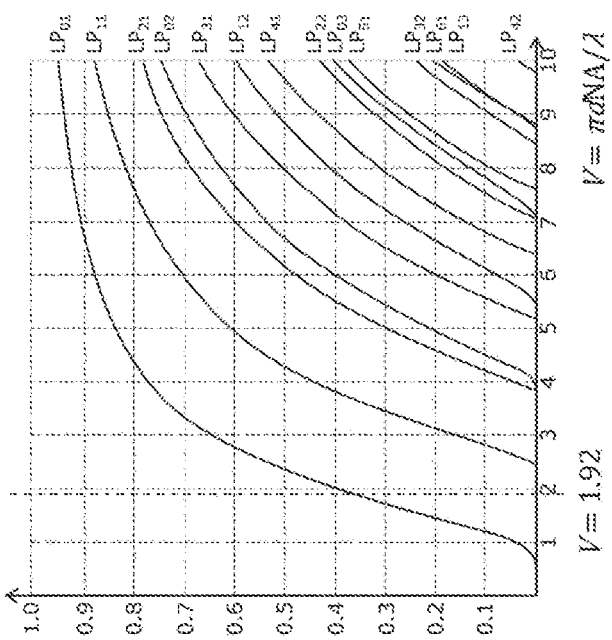

Thus, as indicated in FIG. 3B, the normalized frequency V is set at 2.405 or lower, allowing propagation only in the basic mode of LP01, that is, in the single mode. The larger the core diameter, the larger the number of modes that allow propagation. In this connection, for example, a typical multimode fiber having a core diameter of 50 μm allows propagation in several hundred modes.

In the case of optical communications through space coupling in FIG. 1, the small core diameter in the single mode results in strict positioning of an optically coupled portion on the transmission side/reception side, which requires high accuracy for correct alignment of an optical axis.

In order to solve this problem, generally, the entry of light into a fiber core is facilitated by using high-precision components or machining an optical input portion into an optical fiber. However, high-accuracy components are expensive and the need for machining results in high machining cost, so that connectors and systems for single-mode communications generally lead to high cost.

FIGS. 4A, 4B, 5A, and 5B indicate examples of factors responsible for a reduction in the accuracy of optical axis alignment. For example, as illustrated in FIG. 4A, uneven amounts of fixing materials 16T and 16R for fixing ferrules 15T and 15R and the optical fibers 10T and 10R cause optical axis misalignment. Moreover, for example, insufficient accuracy in shaping the lenses 11T and 11R causes optical axis misalignment as illustrated in FIG. 4B.

Furthermore, as illustrated in FIGS. 5A and 5B, the insufficient accuracy of positioning mechanisms (a concave portion 17T, a convex portion 17R) provided for the ferrules 15T and 15R causes optical axis misalignment. The convex portion 17R in FIGS. 5A and 5B may be a pin.

In the present technique, first, the optical fiber allows propagation at a first wavelength only in the basic mode and allows propagation at a second wavelength at least in the primary mode in addition to the basic mode. The optical fiber is provided for communications using light with the second wavelength.

In this configuration, the optical fiber is configured such that wavelength dispersion is zero at the first wavelength. For example, the first wavelength is 1310 nm.

In this case, under the conditions of FIG. 3A, the normalized frequency V=1.92 is determined as indicated in FIG. 3B and the optical fiber acts as a single-mode fiber.

For example, the second wavelength is 850 nm. If light with a wavelength of 850 nm instead of 1310 nm is inputted to an optical fiber under the same conditions as FIG. 3A, the normalized frequency V=2.96 is determined as indicated in FIG. 6B. Thus, as indicated in FIG. 6A, the basic mode of LP01 and the primary mode of LP11 can be present.

Figure 7A:
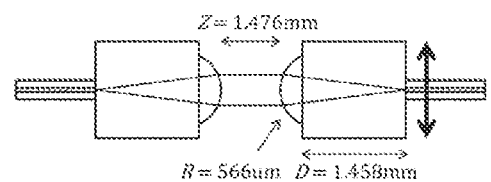
[FIGS. 7A and 7B]
Figure 7B:
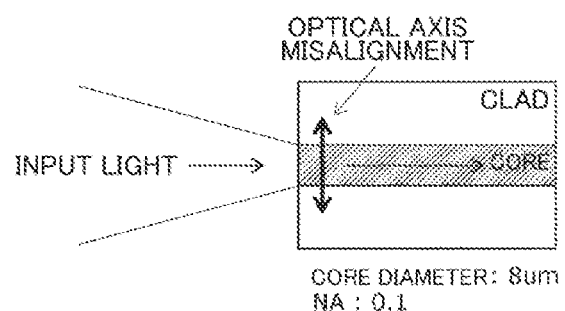

In the following description, it is assumed that when an optical system is configured as illustrated in FIG. 7A, the position of an optical fiber on the reception side is vertically displaced with respect to the optical axis on condition that only the basic mode of LP01 is present for input light (see arrows in FIGS. 7A and 7B), that is, optical axis misalignment occurs.

Figure 8:
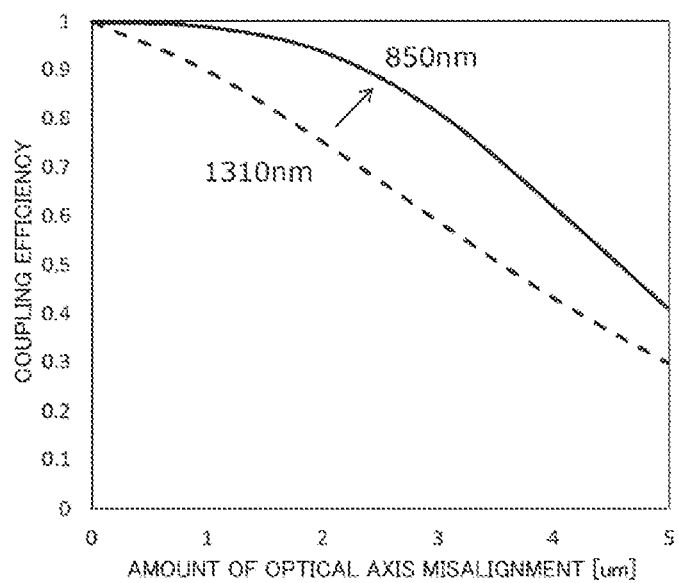
[FIG. 8]

FIG. 8 is a graph indicating the simulation result of coupling efficiency of optical power in such cases. The horizontal axis indicates an amount of optical axis misalignment, and the vertical axis indicates coupling efficiency. In the absence of misalignment, 100% of power propagates through the optical fiber, so that the coupling efficiency is 1. For example, if only 50% of power is propagated through the optical fiber with respect to input power, the coupling efficiency is 0.5.

According to a comparison between 1310 nm and 850 nm, the wavelengths of input light, it is understood that proper characteristics are obtained at 850 nm. This is because propagation is allowed at 1310 nm only in the basis mode while propagation is allowed at 850 nm in the primary mode in addition to the basic mode (see FIG. 6A).

Figure 9A:
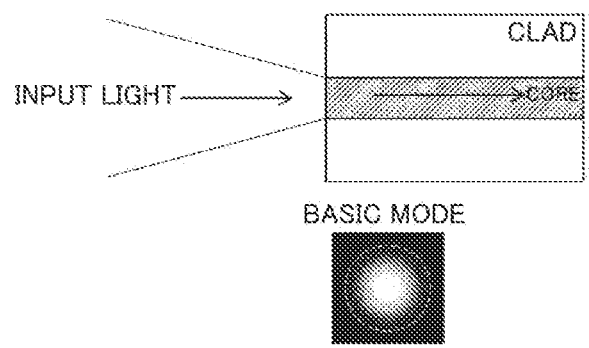
[FIGS. 9A and 9B]
Figure 9B:
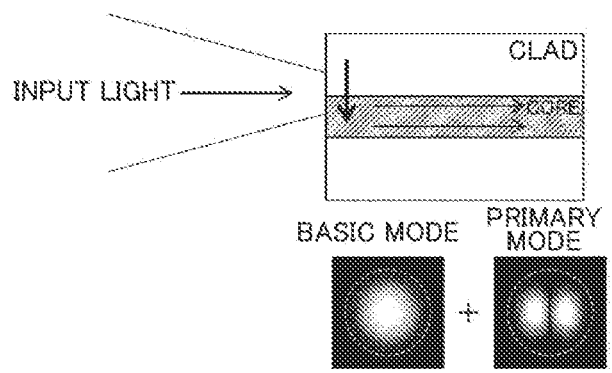

In other words, in the absence of optical axis misalignment, as illustrated in FIG. 9A, only the basic mode is present for input light. In the presence of optical axis misalignment, as illustrated in FIG. 9B, the basic mode is partially converted into the primary mode by using a phase difference caused by a difference in refractive index between the clad and the core. Propagation is not allowed at 1310 nm in the primary mode, whereas propagation is allowed at 850 nm also in the primary mode, so that characteristics improve at 850 nm.

Figure 10:
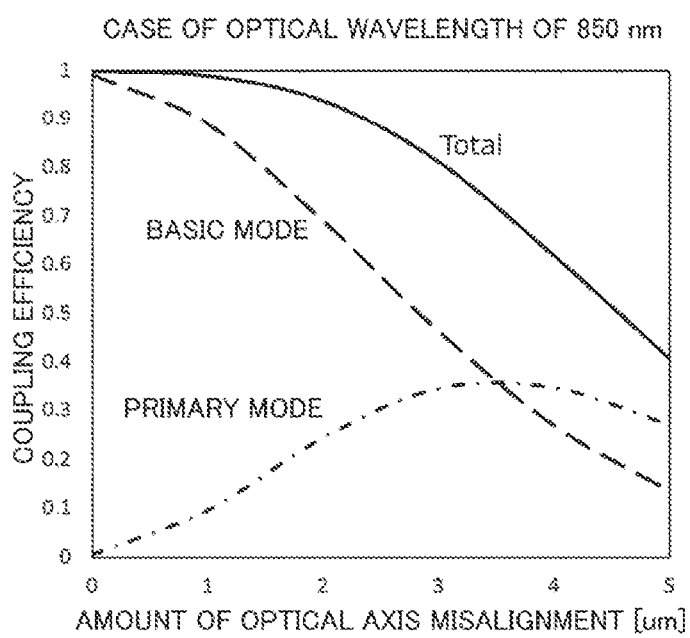
[FIG. 10]

The graph of FIG. 10 indicates a basic mode (zeroth-order mode) component and a primary mode component in a separated manner. A total curve indicates the sum of the components. Only the basic mode is present for input light, proving that the basic mode is converted into the primary mode according to a misalignment. In the case of 1310 nm, propagation is allowed only in the basic mode as indicated in FIG. 3A, so that the basic mode merely declines as indicated in FIG. 8.

In FIG. 8, according to a comparison between 1310 nm and 850 nm, the accuracy of a misalignment can be relaxed by about 1.8 times with coupling efficiency of 0.8 (about −1 dB) and by about 2.35 times with coupling efficiency of 0.9 (about −0.5 dB).

As described above, propagation at the first wavelength (e.g., 1310 nm) through the optical fiber is allowed only in the basic mode, propagation at the second wavelength (e.g., 850 nm) is allowed in at least the primary mode in addition to the basic mode, and at least a primary mode component generated by an optical axis misalignment is propagated with a basic mode component by performing communications using light with the second wavelength, that is, in a double mode. Thus, a coupling loss of optical power can be reduced, the coupling loss being caused by an optical axis misalignment.

In the case of the double mode, a coupling loss caused by a bend of the optical fiber can be reduced.

Figure 11B:
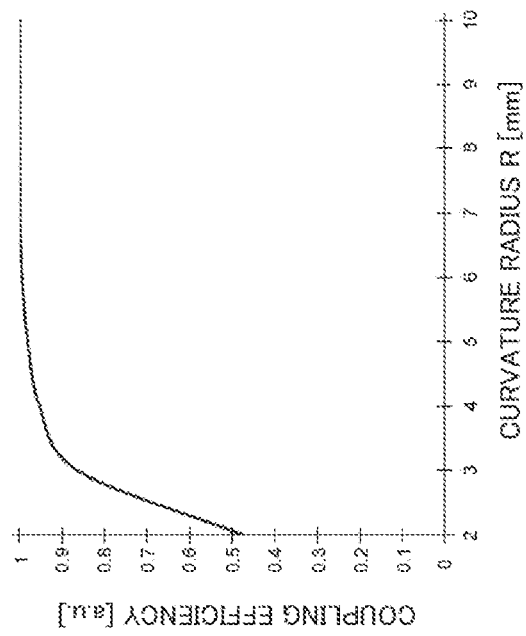
[FIGS. 11A and 11B]
Figure 11A:
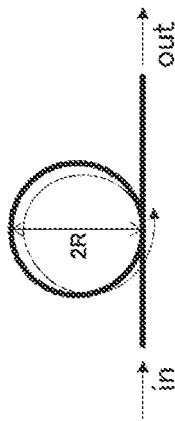

FIG. 11B is a graph indicating the simulation results of coupling efficiency of optical power with respect to a curvature radius R of a bend of the optical fiber in FIG. 11A. In this case, the conditions are a light source at 850 nm and a 1310-nm single-mode fiber serving as an optical fiber. According to the simulation result, the occurrence of a coupling loss starts at about R=6 mm and the coupling loss tends to rapidly increase at R=3 mm or less.

Figure 12:
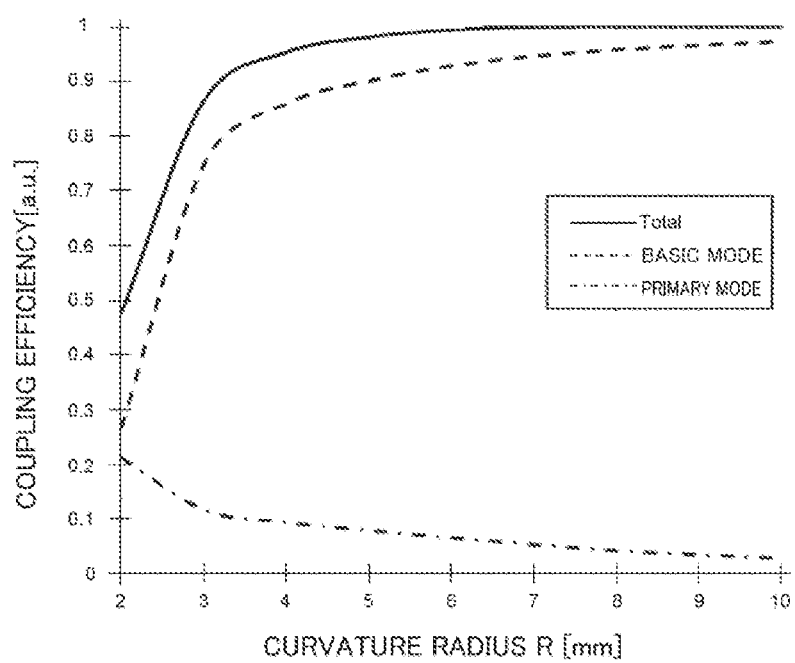
[FIG. 12]

FIG. 12 indicates the simulation result of coupling efficiency of the basic mode and primary mode in a separated manner in addition to the simulation results of coupling efficiency of optical power with respect to the curvature radius R as in FIG. 11B. In this case, the results of addition of the basic mode and the primary mode form a total curve.

On the condition that propagation through the optical fiber is allowed only in the basic mode, that is, in a mode other than the double mode, the optical fiber allowing propagation only in the basic mode does not enable propagation in the primary mode caused by a bend, so that the coupling efficiency is indicated like the curve of the basic mode in FIG. 12. In the case of the double mode, propagation is allowed in the primary mode caused by a bend, so that the coupling efficiency is indicated like the total curve in FIG. 12. Thus, in the case of the double mode, a coupling loss caused by a bend of the optical fiber can be reduced.

Figure 13A:
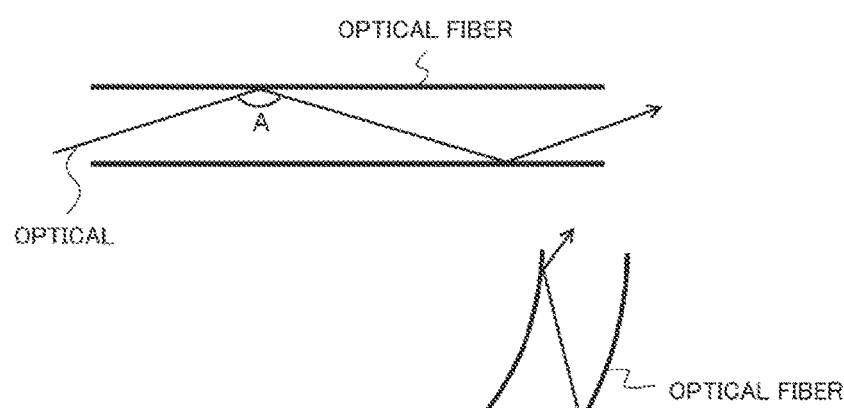
[FIGS. 13A and 13B]
Figure 13B:
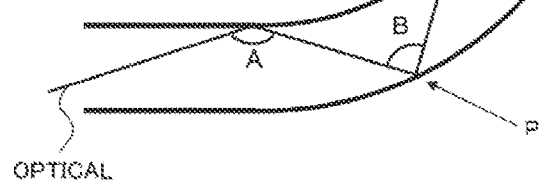

Referring to FIGS. 13A and 13B, the reason why a bend of the optical fiber causes the primary mode will be simply described below. FIG. 13A shows a state in which the optical fiber is not bent. In this case, light travels while totally reflecting at a reflection angle A in the basic mode.

FIG. 13B shows a state in which the optical fiber is bent. In this case, at a bending point (indicated by an arrow P), light totally reflecting at a reflection angle B is generated, the reflection angle B being smaller than the reflection angle A of the basic mode. At this point, light is generated at a reflection angle in the primary mode and is coupled in the optical fiber, so that the light propagates in the primary mode.

As described above, in the case of the double mode, a coupling loss caused by a bend of the optical fiber can be reduced. Even in the double mode, however, a sharp bend (see FIG. 12) rapidly increases a coupling loss. Thus, even in the double mode, it should be noted that wiring is to be installed with a bending amount having a certain margin when the optical fiber is routed.

Figure 14:
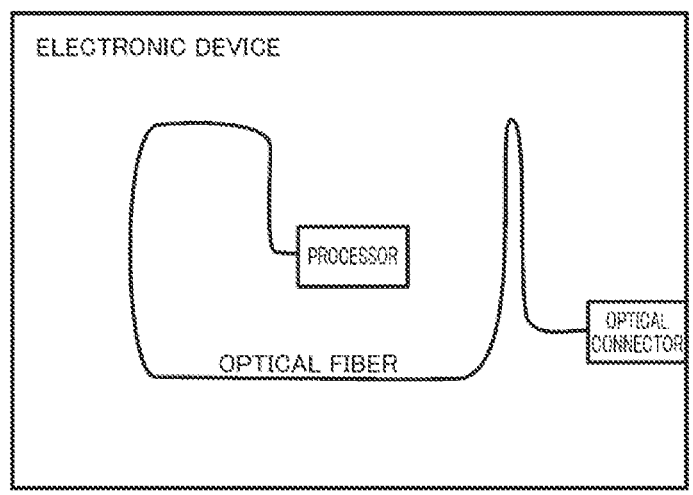
[FIG. 14]

FIG. 14 illustrates an example of routing of an optical fiber in an electronic device, for example, a television receiver. In this example, the optical fiber is routed between an optical connector and a processor. In this configuration, the optical connector is a connector for inputting or outputting an optical signal. The processor performs processing for receiving or transmitting an optical signal.

In order to increase the design flexibility of the electronic device, it is highly likely that the optical fiber is not linearly routed with the shortest possible length. In this case, the optical fiber may be bent and disposed as illustrated in FIG. 14. For example, in the case of compact electronic devices such as a mobile computing device, it is expected that optical fibers need to be further bent when being routed.

If an optical fiber has a sharply bent portion, the bend of the optical fiber may increase a coupling loss, affect the quality of communications, and interfere with communications in some cases.

Secondly, the present technique obtains a bending amount of the optical fiber on the basis of the amount of a primary mode component included in an optical signal outputted with the second wavelength from the optical fiber. In this case, an optical signal having only a basic mode component with the second wavelength is inputted to the optical fiber.

Figure 15:
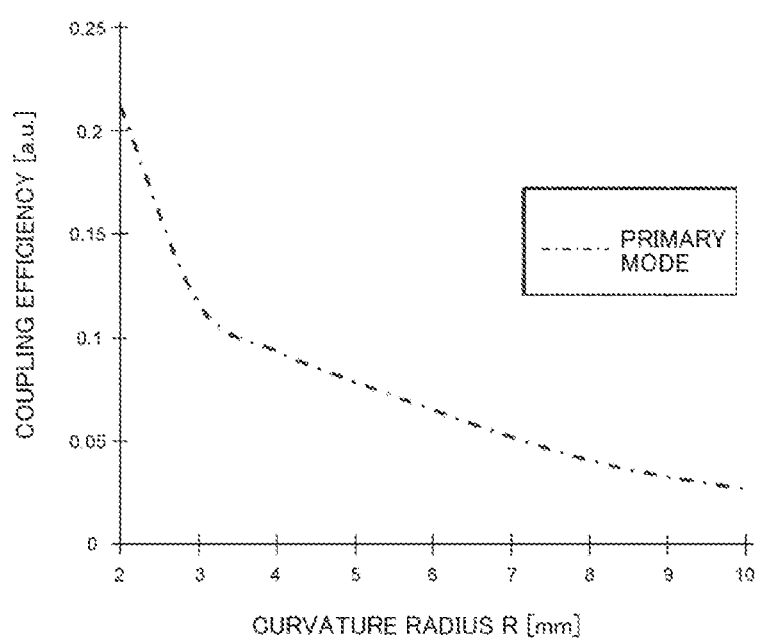
[FIG. 15]

FIG. 15 is an enlargement of the vertical axis of coupling efficiency in the primary mode in FIG. 12. It is understood that the smaller the curvature radius R, that is, the sharper the bend, the larger the amount of generation of the primary mode and conversely, the larger the curvature radius R, that is, the slighter the bend, the smaller the amount of generation of the primary mode. Thus, the bending amount (=curvature radius R) of the optical fiber can be obtained on the basis of the amount of the primary mode component outputted from the optical fiber. Furthermore, the appropriateness of the routing of the optical fiber can be determined on the basis of the obtained bending amount.

Unlike a guideline for determining whether the system is appropriate by simply measuring a coupling loss, an advantage offered by obtaining a bending amount by measuring the primary mode is to determine whether routing has a margin in an electronic device.

In a determination on whether the system is appropriate by simply measuring a coupling loss, if a coupling loss generated by a bend is barely enough that the system can be appropriate, it is determined that the system is appropriate. A deformation of the bend due to vibrations or aging degradation or the like may affect the quality of communications. However, by obtaining a bending amount by measuring the primary mode, whether routing has a certain margin for bends of the optical fiber can be determined.

It is difficult to predict the bending amount of the optical fiber from the amount of coupling loss. The absolute value of the amount of light outputted from an electronic device varies depending upon an optical module. Thus, without a total inspection, the absolute value of the amount of light outputted from an electronic device cannot be determined in the absence of a bend. In other words, a lost amount of light outputted from an electronic device cannot be determined when an amount of light is lost by a bend.

Thus, for example, even at a portion where a coupling loss rapidly increases around R=3 mm, that is, with an amount of bending like a cliff as indicated in FIG. 12, such a bending amount cannot be determined from an amount of coupling loss. When a bending amount is slightly increased by some vibrations or aging degradation or the like, the coupling loss rapidly increases.

In contrast, if a bending amount is obtained by measuring the primary mode, the primary mode is generated by a bend of the optical fiber and the amount of generation of the primary mode changes according to the bending amount of the optical fiber, so that the bending amount of the optical fiber can be accurately obtained. Whether routing has a certain margin for bends of the optical fiber can be determined by a bending amount provided as a judgement point.

First Embodiment

Figure 16:
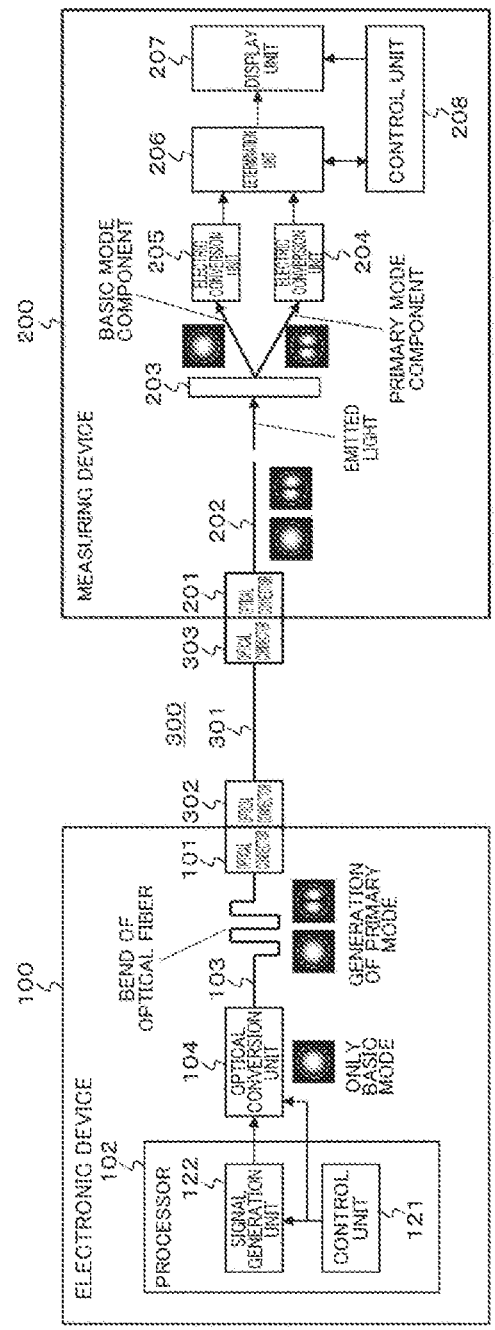
[FIG. 16]

FIG. 16 illustrates a system example in which the bending amount of an optical fiber 103 routed in an electronic device 100 is measured by a measuring device 200 according to a first embodiment.

The electronic device 100 includes an optical connector 101 serving as a receptacle, a processor 102, and the optical fiber 103 routed between the optical connector 101 and the processor 102.

The optical connector 101 is a connector for inputting or outputting an optical signal. For example, if the electronic device 100 is an AV sink that receives an optical signal, the optical connector 101 serves as a connector for inputting the optical signal. For example, if the electronic device 100 is an AV source that transmits an optical signal, the optical connector 101 serves as a connector for outputting the optical signal.

The processor 102 performs processing for receiving or transmitting an optical signal. For example, if the electronic device 100 is an AV sink that receives an optical signal, the processor 102 in a receiving operation receives a received signal (optical signal), which is inputted to the optical connector 101 and passes through the optical fiber 103, and performs predetermined receiving processing on the signal. For example, if the electronic device 100 is an AV source that transmits an optical signal, the processor 102 in a transmitting operation outputs a transmitted signal (optical signal), which is obtained by performing predetermined transmitting processing on the signal, to the optical connector 101 through the optical fiber 103.

The optical fiber 103 allows propagation at the first wavelength only in the basic mode. In this case, the first wavelength is 1310 nm, the core diameter d and the numerical aperture NA are set as d=8 μm and NA=0.1 that are ordinary parameters of a 1310-nm optical fiber, and the normalized frequency V=1.92 is set. In other words, the optical fiber 103 acts as a single-mode fiber at the wavelength of 1310 nm (see FIGS. 3A and 3B).

In the electronic device 100, communications are performed by using light with the second wavelength. At the second wavelength, the optical fiber 103 allows propagation at least in the primary mode in addition to the basic mode. In this configuration, the second wavelength is set at 850 nm, and the optical fiber 103 allows propagation in the primary mode in addition to the basic mode (see FIGS. 6A and 6B).

Furthermore, the processor 102 includes a control unit 121 and a signal generation unit 122, and the electronic device 100 includes an optical conversion unit 104. The control unit 121 controls the operations of the units of the processor 102 and also controls the operation of the optical conversion unit 104.

The control unit 121 starts control in a test mode on the basis of a user operation for providing an instruction to start the test mode. For example, a user operation for providing an instruction to start a test is performed with a remote control. Moreover, for example, a user operation for providing an instruction to start a test is performed on the basis of an input operation of a test start instruction signal to the control unit 121 from a connector connected to the device's exterior, which is not illustrated. The user operation for providing an instruction to start a test is not limited thereto and may be performed in other forms.

After starting the control in the test mode, the control unit 121 starts the operations of the signal generation unit 122 and the optical conversion unit 104. Thus, the output of a test signal in a predetermined pattern from the signal generation unit 122 to the optical conversion unit 104 is started, and the input of an optical signal, which corresponds to the test signal, with the second wavelength from the optical conversion unit 104 to the optical fiber 103 is started.

In this case, on the assumption that one end of the optical fiber 103 is located near the optical connector 101, an optical signal with the second wavelength is inputted to the other end of the optical fiber 103 near the processor 102. Since the pattern of the test signal is designed for evaluating a coupling loss, a pattern of a continuously fixed optical output or a continuous pattern of, for example, "0101" may be used. The pattern is not limited thereto.

In this case, the optical signal to be inputted with the second wavelength to the optical fiber 103 from the optical conversion unit 104 is provided only with the basic mode. The optical signal with the second wavelength is propagated through the optical fiber 103 and is outputted from the optical connector 101. The optical signal outputted with the second wavelength from the optical connector 101 includes the primary mode, which is generated at a bend of the fiber, in addition to the basic mode.

In this case, the optical signal with the second wavelength includes the component of the primary mode according to the bending amount of the optical fiber 103 (see FIG. 12). Moreover, in this case, the ratio of the amount of the primary mode component and the amount of a basic mode component corresponds to the bending amount of the optical fiber 103, the components being included in the optical signal with the second wavelength.

Figure 17:
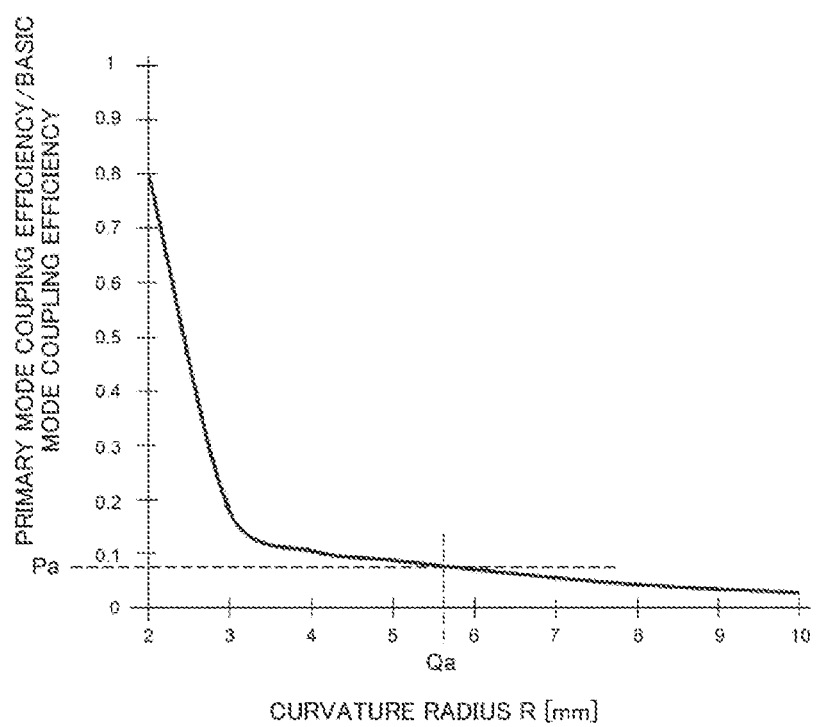
[FIG. 17]
Figure 18:
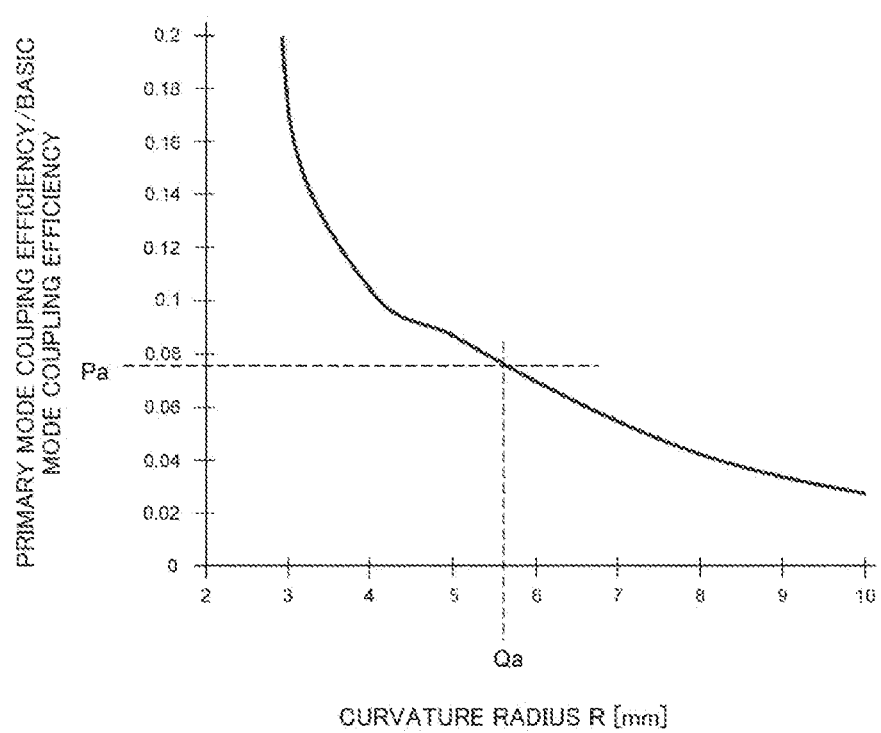
[FIG. 18]

FIG. 17 corresponds to FIG. 12 and shows a simulation result indicating the ratio of an amount of the primary mode component and an amount of the basic mode component (the ratio of primary mode coupling efficiency/basic mode coupling efficiency) with respect to a curvature radius R. FIG. 18 is an enlargement of the range of 0 to 0.2 on the vertical axis in FIG. 17.

As described above, the ratio of the amount of the primary mode component and the amount of the basic mode component corresponds to the bending amount of the optical fiber 103, the components being included in the optical signal with the second wavelength. This can obtain the bending amount (=curvature radius R) of the optical fiber 103 on the basis of the ratio and determine the appropriateness of the routing of the optical fiber 103 on the basis of the obtained bending amount.

After starting the operations of the signal generation unit 122 and the optical conversion unit 104, the control unit 121 terminates the operations of the signal generation unit 122 and the optical conversion unit 104 on the basis of a user operation for providing an instruction to terminate the test mode. Thus, the output of a test pattern signal from the signal generation unit 122 to the optical conversion unit 104 is terminated, and the input of an optical signal, which corresponds to the test pattern signal, with the second wavelength from the optical conversion unit 104 to the optical fiber 103 is terminated. The control unit 121 then terminates control in the test mode. The user operation for providing an instruction to terminate a test is performed like the user operation for providing an instruction to start a test. The detailed description thereof is omitted.

In the electronic device 100 configured thus, in the test mode, the optical signal having only the basic mode with the second wavelength is inputted to the other end of the optical fiber 103 near the processor 102, and the optical signal outputted with the second wavelength from the optical connector 101 connected to one end of the optical fiber 103 includes an amount of the primary mode component according to the bending amount of the optical fiber 103. Thus, the bending amount of the optical fiber 103 can be properly measured on the basis of the amount of the primary mode component, and the appropriateness of the routing of the optical fiber 103 in the electronic device 100 can be determined on the basis of the bending amount.

The measuring device 200 includes an optical connector 201 serving as a receptacle, an optical fiber 202, a volume hologram 203, electric conversion units 204 and 205, a determination unit 206, a display unit 207, and a control unit 208.

The optical connector 201 is connected to the optical connector 101 of the electronic device 100 via a cable 300. In other words, the cable 300 is configured with optical connectors 302 and 303 serving as plugs on one end and the other end of an optical fiber 301. The optical connector 302 on one end of the optical fiber 301 is connected to the optical connector 101 of the electronic device 100, and the optical connector 303 on the other end of the optical fiber 301 is connected to the connector 201 of the measuring device 200.

The optical fiber 202 of the measuring device 200 is configured to input, to the volume hologram 203, an optical signal to be inputted to the optical connector 201. One end of the optical fiber 202 is connected to the optical connector 201. The optical signal inputted to the optical connector 201 is propagated through the optical fiber 202 and is emitted into the volume hologram 203 from the other end of the optical fiber 202.

In this case, the optical fiber 301 of the cable 300 and the optical fiber 202 of the measuring device 200 are configured like the optical fiber 103 of the electronic device 100. Thus, the optical signal outputted with the second wavelength from the optical connector 101 of the electronic device 100

(including an amount of the primary mode component according to the bending amount of the optical fiber 103) is directly propagated through the optical fiber 301 and the optical fiber 202 and is emitted into the volume hologram 203 from the other end of the optical fiber 202. In order to accurately obtain the bending amount of the optical fiber 103 of the electronic device 100 in the measuring device 200, the bending amounts of the optical fiber 301 and the optical fiber 202 need to be small enough to prevent the generation of at least the primary mode.

The volume hologram 203 constitutes a mode separator. The volume hologram 203 separately outputs the basic mode component and the primary mode component from the optical signal emitted and inputted with the second wavelength from the other end of the optical fiber 202. The volume hologram 203 may be replaced with a mode separator having another configuration.

The electric conversion unit 204 converts, into an electric signal, the primary mode component (optical signal) separately outputted through the volume hologram 203. The level of the electric signal indicates the amount of the primary mode component. Moreover, the electric conversion unit 205 converts, into an electric signal, the basic mode component (optical signal) separately outputted though the volume hologram 203. The level of the electric signal indicates the amount of the basic mode component.

The determination unit 206 first determines the level ratio of the output of the electric conversion unit 204 and the output of the electric conversion unit 205 as the ratio of the amount of the primary mode component and the amount of the basic mode component. In this sense, the determination unit 206 constitutes an arithmetic unit.

Secondly, the determination unit 206 converts the determined ratio into a bending amount (curvature radius R) of the optical fiber 103 on the basis of relationship information (see FIGS. 17 and 18) about the bending amount of the optical fiber and the ratio of the amount of the primary mode component and the amount of the basic mode component. In this sense, the determination unit 206 further constitutes a conversion unit.

In this case, as the relationship information about the bending amount of the optical fiber and the ratio of the amount of the primary mode component and the amount of the basic mode component, for example, information is obtained by using the optical fiber 103 used in the electronic device 100 and an optical signal similar to the optical signal outputted from the optical conversion unit 104 into the optical fiber 103. The bending amount of the optical fiber 103 can be more accurately determined by using the information.

For example, if the relationship information is indicated as in FIGS. 17 and 18, the determination unit 206 obtains Qa as a bending amount when the ratio of the amount of the primary mode component and the amount of the basic mode component (primary mode coupling efficiency/basic mode coupling efficiency) is Pa.

Thirdly, the determination unit 206 determines the appropriateness of the routing of the optical fiber 103 in the electronic device 100 on the basis of the obtained bending amount (curvature radius R) of the optical fiber 103. In this case, the determination unit 206 compares the obtained bending amount of the optical fiber 103 with the bending amount of the judgement point. If the obtained bending amount is smaller than the judgement point, it is determined that the routing is not appropriate (=NG). If the obtained bending amount is equal to or larger than the judgement point, it is determined that the routing is appropriate (=OK).

In this case, for example, according to the relationship information indicated in FIGS. 17 and 18, a coupling loss tends to rapidly increase at R=3 mm or less as indicated in FIG. 12. Thus, the judgement point is set at R=4 mm with a certain margin, for example, a 1-mm margin. This setting is merely exemplary and is not limited thereto.

The display unit 207 displays information including the determination result of the appropriateness of the routing of the optical fiber 103 for the electronic device 100 in the determination unit 206. This information may further include the bending amount (=curvature radius) of the optical fiber 103 for the electronic device 100 or the bending margin of the optical fiber 103 in addition to the determination result. On the assumption that the current bending amount is larger than the judgement point, the bending margin of the optical fiber 103 indicates a difference between the current bending amount and the judgement point.

Figure 19:
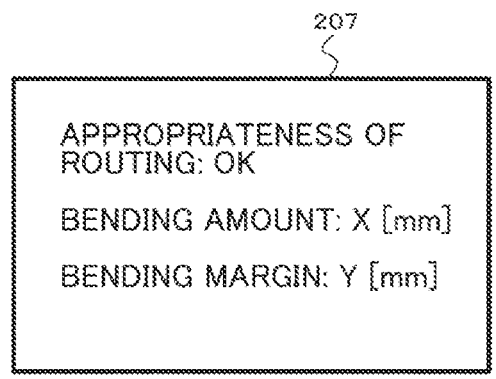
[FIG. 19]

FIG. 19 illustrates a display example of the display unit 207. The example of FIG. 19 shows the determination result of the appropriateness of the routing of the optical fiber 103 for the electronic device 100, the current bending amount of the optical fiber 103 for the electronic device 100, and the bending margin of the optical fiber 103 for the electronic device 100. A user can easily access information including the appropriateness of routing, the bending amount, and the bending margin of the optical fiber 103 of the electronic device 100 on the basis of the display of the display unit 207.

The control unit 208 controls the operations of the determination unit 206 and the display unit 207. When it is determined that the measuring device 200 has started receiving the optical signal outputted with the second wavelength from the electronic device 100 in the test mode, the control unit 208 starts the operations of the determination unit 206 and the display unit 207. After the operations of the determination unit 206 and the display unit 207 are started as described above, when it is determined that the measuring device 200 has terminated the reception of the optical signal outputted with the second wavelength from the electronic device 100 in the test mode, the control unit 208 terminates the operations of the determination unit 206 and the display unit 207.

By monitoring the outputs of the electric conversion units 204 and 205 into the determination unit 206, the control unit 208 determines whether the measuring device 200 has started receiving the optical signal outputted with the second wavelength from the electronic device 100 in the test mode or has terminated the reception of the optical signal. The process is not limited thereto regarding the determination on whether the measuring device 200 has started receiving the optical signal outputted with the second wavelength from the electronic device 100 in the test mode or has terminated the reception of the optical signal.

As described above, the operations of the determination unit 206 and the display unit 207 are started when the measuring device 200 has started receiving the optical signal outputted with the second wavelength from the electronic device 100 in the test mode, and the operations are terminated at the end of the reception of the optical signal. Thus, the determination unit 206 and the display unit 207 operate efficiently, achieving lower power consumption.

Figure 20:
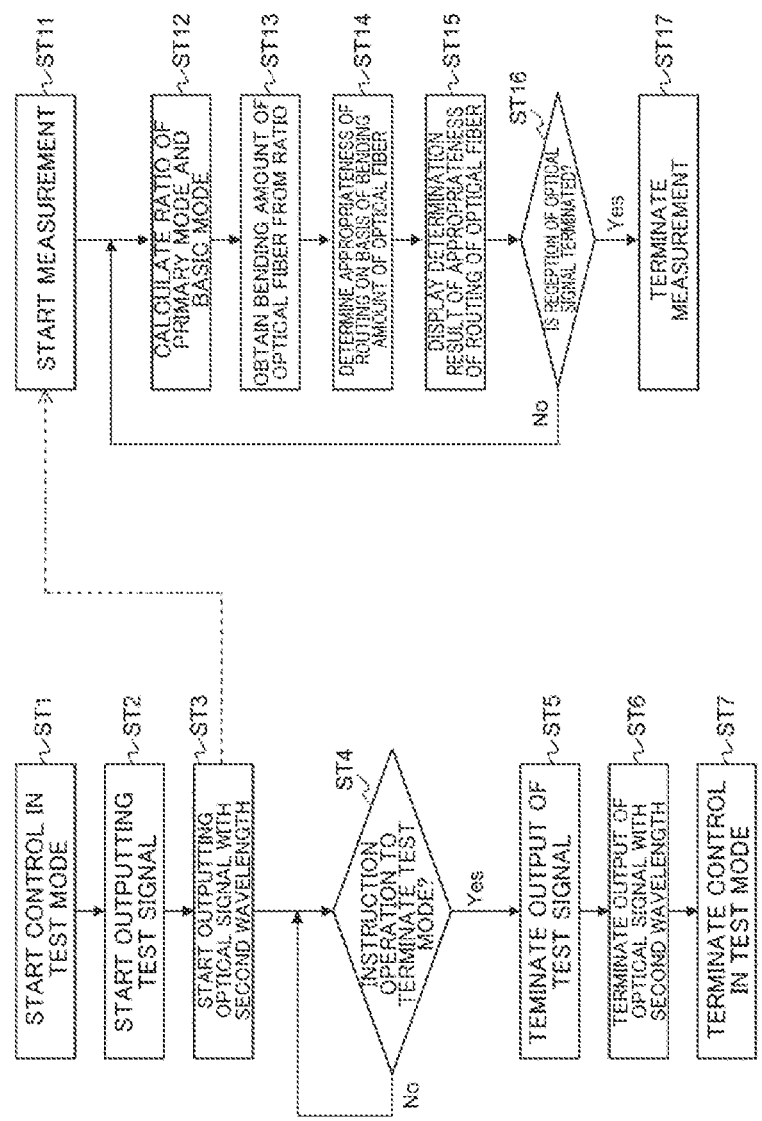
[FIG. 20]

The flowchart of FIG. 20 shows an example of steps for a test mode in the electronic device 100 and steps in the measuring device 200.

First, the steps for the test mode in the electronic device 100 will be described below. First, in step ST1, the control unit 121 starts control in the test mode on the basis of a user operation for providing an instruction to start the test mode.

In step ST2, the signal generation unit 122 starts outputting a test signal in a predetermined pattern to the optical conversion unit 104 on the basis of the control of the control unit 121.

In step ST3, the optical conversion unit 104 starts outputting the optical signal with the second wavelength on the basis of the control of the control unit 121, the optical signal corresponding to the test signal. The optical signal is inputted to the optical fiber 103, is propagated through the optical fiber 103, and is outputted from the optical connector 101. The optical signal outputted with the second wavelength from the optical connector 101 includes the primary mode, which is generated at a bend of the fiber, in addition to the basic mode.

In step ST4, the control unit 121 determines the presence or absence of a user operation for providing an instruction to terminate the test mode. When the presence of a user operation for providing an instruction to terminate the test mode is determined, in step ST5, the signal generation unit 122 terminates the output of the test signal in the predetermined pattern to the optical conversion unit 104 on the basis of the control of the control unit 121.

In step ST6, the optical conversion unit 104 terminates the output of the optical signal with the second wavelength on the basis of the control of the control unit 121, the optical signal corresponding to the test signal. In step ST7, the control unit 121 terminates control in the test mode.

The steps in the measuring device 200 will be described below. First, in step ST11, when it is determined that the reception of the optical signal outputted with the second wavelength from the electronic device 100 in the test mode has been started, the control unit 208 starts measurement. In this case, the determination unit 206 and the display unit 207 start operating on the basis of the control of the control unit 208. By monitoring the outputs of the electric conversion units 204 and 205 into the determination unit 206, the control unit 208 determines whether the reception of the optical signal outputted with the second wavelength from the electronic device 100 in the test mode has been started.

In step ST12, the determination unit 206 calculates the level ratio of the output of the electric conversion unit 204 and the output of the electric conversion unit 205 as the ratio of the amount of the primary mode component and the amount of the basic mode component.

In step ST13, the determination unit 206 obtains the bending amount (curvature radius R) of the optical fiber 103 of the electronic device 100 from the ratio calculated in step ST12. In this case, the determination unit 206 converts the ratio calculated in step ST12 into a bending amount (curvature radius R) on the basis of the relationship information (see FIGS. 17 and 18) about the bending amount of the optical fiber and the ratio of the amount of the primary mode component and the amount of the basic mode component.

In step ST14, the determination unit 206 determines the appropriateness of the routing of the optical fiber 103 in the electronic device 100 on the basis of the bending amount (curvature radius R) obtained in step ST13. In this case, if the bending amount obtained in step ST13 is smaller than the bending amount of the judgement point, the determination unit 206 determines that the routing is not appropriate (=NG). If the bending amount obtained in step ST13 is equal to or larger than the judgement point, the determination unit 206 determines that the routing is appropriate (=OK).

In step ST15, the display unit 207 displays information including the determination result of the appropriateness of the routing of the optical fiber 103 for the electronic device 100 in the determination unit 206 (see FIG. 19).

In step ST16, the control unit 208 determines whether the reception of the optical signal outputted with the second wavelength from the electronic device 100 in the test mode has been terminated. In this case, by monitoring the outputs of the electric conversion units 204 and 205 into the determination unit 206, the control unit 208 determines whether the reception of the optical signal outputted with the second wavelength from the electronic device 100 in the test mode has been terminated.

When the reception has not been terminated, the process returns to the processing of step ST12 to repeatedly perform the same processing. When the reception is terminated, the control unit 208 terminates the measurement in step ST17. In this case, the determination unit 206 and the display unit 207 terminates the operations on the basis of the control of the control unit 208.

In the steps in the measuring device 200, the display unit 207 displays, for example, the determination result of the appropriateness of the routing of the optical fiber 103 in step ST15, and then the flow of steps ST12 to ST15 is repeated until the completion of the reception of the optical signal outputted with the second wavelength from the electronic device 100 in the test mode. After the processing of step ST15, the process may immediately advance to the processing of step ST17 on the assumption that the series of measurement is completed.

In the system example of FIG. 16, the measuring device 200 obtains the bending amount of the optical fiber 103 on the basis of the amount of the primary mode component included in the optical signal with the second wavelength where the optical fiber 103 allows propagation at least in the primary mode in addition to the basic mode, the optical signal being outputted from the optical fiber 103 that allows propagation only in the basic mode at the first wavelength in the electronic device 100. This can properly measure the bending amount of the optical fiber 103 routed in the electronic device 100.

Moreover, in the system example of FIG. 16, the measuring device 200 obtains the bending amount of the optical fiber 103 of the electronic device 100 by using the ratio of the amount of the primary mode component included in the optical signal with the second wavelength and the amount of the basic mode component included in the optical signal with the second wavelength. Regardless of the power of the optical signal inputted to the optical fiber 103 in the electronic device 100, and thus even if the power of the optical signal inputted to the optical fiber 103 is not determined, the bending amount of the optical fiber 103 can be obtained.

Furthermore, in the system example of FIG. 16, the measuring device 200 determines the appropriateness of the routing of the optical fiber 103 in the electronic device 100 on the basis of the obtained bending amount. The determination result can be provided to a user through the display or the like. At this point, the bending amount of the optical fiber 103 and the bending margin of the optical fiber 103 are also displayed, allowing the user to easily identify the bending amount of the optical fiber 103 and the bending margin of the optical fiber 103.

In the system example of FIG. 16, the determination unit 206 and the display unit 207 of the measuring device 200 are started at the start of the reception of the optical signal outputted with the second wavelength from the electronic device 100 in the test mode, and the operations of the units are terminated at the end of the reception of the optical signal. The determination unit 206 and the display unit 207 operate efficiently, achieving lower power consumption.

Moreover, in the system example of FIG. 16, the electronic device 100 is configured such that the optical signal having only the basic mode with the second wavelength is inputted to the other end of the optical fiber 103 routed in the electronic device 100. The optical signal outputted with the second wavelength from one end of the optical fiber 103 includes an amount of the primary mode component according to the bending amount of the optical fiber 103. The measuring device 200 can properly measure the bending amount of the optical fiber 103 of the electronic device 100 on the basis of the amount of the primary mode component and can also determine the appropriateness of the routing of the optical fiber 103 from the bending amount.

Second Embodiment

Figure 21:
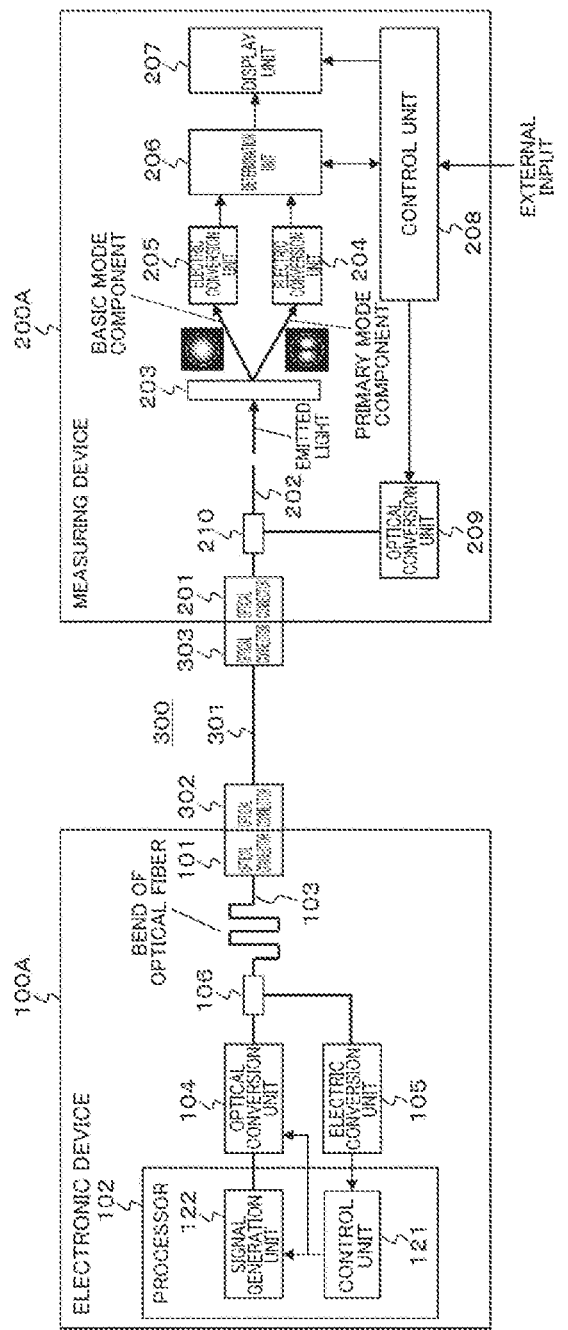
[FIG. 21]

FIG. 21 illustrates a system example in which the bending amount of an optical fiber 103 routed in an electronic device 100A is measured by a measuring device 200A according to a second embodiment. In FIG. 21, the parts corresponding to those in FIG. 16 are denoted by the same reference numerals, and detailed descriptions thereof are omitted as appropriate.

Like the electronic device 100 illustrated in FIG. 16, the electronic device 100A includes an optical connector 101 serving as a receptacle, a processor 102, and the optical fiber 103 routed between the optical connector 101 and the processor 102.

The processor 102 includes a control unit 121 and a signal generation unit 122, and the electronic device 100A includes an optical conversion unit 104, an electric conversion unit 105, and a wavelength selection filter 106.

In this configuration, the wavelength selection filter is a filter that allows passage only at a specific wavelength and causes total reflection at other wavelengths. The wavelength selection filter is disposed at an angle of 45° with respect to an optical path and thus can selectively change the optical path only at a target wavelength. In the second embodiment, an optical signal transmitted from the electronic device 100A to the measuring device 200A has a second wavelength (e.g., 850 nm) but an optical signal transmitted from the measuring device 200A to the electronic device 200A has a different wavelength (e.g., 1320 nm) from the second wavelength.

Figure 22A:
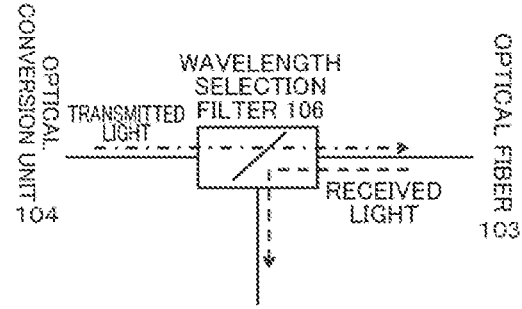
[FIGS. 22A and 22B]

As illustrated in FIG. 22A, the wavelength selection filter 106 allows the passage of transmitted light from the optical conversion unit 104 into the optical fiber 103 and totally reflects received light from the optical fiber 103 into the electric conversion unit 105.

When the received light outputted from the optical fiber 103 is an optical signal indicating start, the electric conversion unit 105 converts the optical signal into a test-mode start signal as an electric signal and transmits the signal to the control unit 121 of the processor 102. When the received light outputted from the optical fiber 103 is an optical signal indicating termination, the electric conversion unit 105 converts the optical signal into a test-mode termination signal as an electric signal and transmits the signal to the control unit 121 of the processor 102.

The control unit 121 starts control in the test mode on the basis of the reception of the test-mode start signal from the electric conversion unit 105. After starting the control in the test mode, the control unit 121 starts the operations of the signal generation unit 122 and the optical conversion unit 104. Thus, the output of a test signal in a predetermined pattern from the signal generation unit 122 to the optical conversion unit 104 is started, and the input of an optical signal, which corresponds to the test signal, with the second wavelength is started, the optical signal being inputted from the optical conversion unit 104 to the optical fiber 103 through the wavelength selection filter 106.

In this case, the optical signal to be inputted with the second wavelength to the optical fiber 103 is provided only with the basic mode. The optical signal with the second wavelength is propagated through the optical fiber 103 and is outputted from the optical connector 101. The optical signal outputted with the second wavelength from the optical connector 101 includes the primary mode, which is generated at a bend of the fiber, in addition to the basic mode.

In this case, the optical signal with the second wavelength includes the component of the primary mode according to the bending amount of the optical fiber 103 (see FIG. 12. Moreover, in this case, the ratio of the amount of the primary mode component and the amount of a basic mode component corresponds to the bending amount of the optical fiber 103, the components being included in the optical signal with the second wavelength (see FIGS. 17 and 18).

As described above, the ratio of the amount of the primary mode component and the amount of the basic mode component corresponds to the bending amount of the optical fiber 103, the components being included in the optical signal with the second wavelength. This can obtain the bending amount (=curvature radius R) of the optical fiber 103 on the basis of the ratio and determine the appropriateness of the routing of the optical fiber 103 on the basis of the obtained bending amount.

After starting the operations of the signal generation unit 122 and the optical conversion unit 104, the control unit 121 terminates the operations of the signal generation unit 122 and the optical conversion unit 104 on the basis of the reception of the test-mode termination signal from the electric conversion unit 105. Thus, the output of a test pattern signal from the signal generation unit 122 to the optical conversion unit 104 is terminated, and the input of the optical signal, which corresponds to the test pattern signal, with the second wavelength is terminated, the optical signal being inputted from the optical conversion unit 104 to the optical fiber 103 through the wavelength selection filter 106. The control unit 121 then terminates control in the test mode.

In the electronic device 100A configured thus, in the test mode, the optical signal with the second wavelength only in the basic mode is inputted to the other end of the optical fiber 103 near the processor 102, and the optical signal outputted with the second wavelength from the optical connector 101 connected to one end of the optical fiber 103 includes an amount of the primary mode component according to the bending amount of the optical fiber 103. Thus, the bending amount of the optical fiber 103 can be properly measured on the basis of the amount of the primary mode component, and the appropriateness of the routing of the optical fiber 103 in the electronic device 100A can be determined on the basis of the bending amount.

The measuring device 200A includes an optical connector 201 serving as a receptacle, an optical fiber 202, a volume hologram 203, electric conversion units 204 and 205, a determination unit 206, a display unit 207, a control unit 208, an optical conversion unit 209, and a wavelength selection filter 210.

The optical connector 201 is connected to the optical connector 101 of the electronic device 100A via a cable 300.

An optical connector 302 on one end of an optical fiber 301 is connected to the optical connector 101 of the electronic device 100A, and an optical connector 303 on the other end of the optical fiber 301 is connected to the connector 201 of the measuring device 200A.

The optical fiber 202 of the measuring device 200A is configured to input, to the volume hologram 203, an optical signal to be inputted to the optical connector 201. One end of the optical fiber 202 is connected to the optical connector 201 via the wavelength selection filter 210. The optical signal inputted to the optical connector 201 is propagated through the optical fiber 202 and is emitted into the volume hologram 203 from the other end of the optical fiber 202.

In this case, the optical fiber 301 of the cable 300 and the optical fiber 202 of the measuring device 200A are configured like the optical fiber 103 of the electronic device 100A. Thus, the optical signal outputted with the second wavelength from the optical connector 101 of the electronic device 100A (including an amount of the primary mode component according to the bending amount of the optical fiber 103) is directly propagated through the optical fiber 301 and the optical fiber 202 and is emitted into the volume hologram 203 from the other end of the optical fiber 202.

Figure 22B:
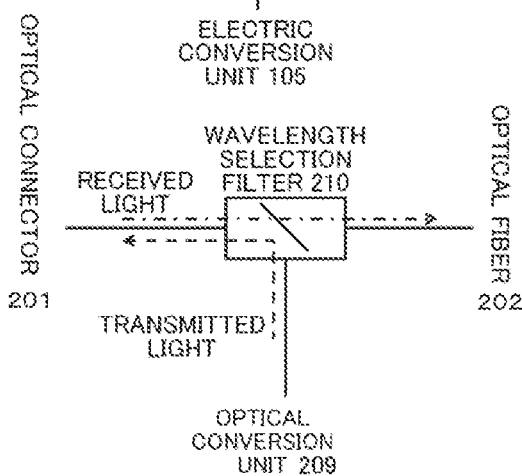

As illustrated in FIG. 22B, the wavelength selection filter 210 allows the passage of received light from the optical connector 201 into the optical fiber 202 and totally reflects transmitted light from the optical conversion unit 209 into the optical connector 201.

The volume hologram 203 constitutes a mode separator. The volume hologram 203 separately outputs the basic mode component and the primary mode component from the optical signal emitted and inputted with the second wavelength from the other end of the optical fiber 202.

The electric conversion unit 204 converts, into an electric signal, the primary mode component (optical signal) separately outputted through the volume hologram 203. The level of the electric signal indicates the amount of the primary mode component. Moreover, the electric conversion unit 205 converts, into an electric signal, the basic mode component (optical signal) separately outputted though the volume hologram 203. The level of the electric signal indicates the amount of the basic mode component.

The determination unit 206 first determines the level ratio of the output of the electric conversion unit 204 and the output of the electric conversion unit 205 as the ratio of the amount of the primary mode component and the amount of the basic mode component. Secondly, the determination unit 206 converts the determined ratio into a bending amount (curvature radius R) of the optical fiber 103 on the basis of relationship information (see FIGS. 17 and 18) about the bending amount of the optical fiber and the ratio of the amount of the primary mode component and the amount of the basic mode component. Thirdly, the determination unit 206 determines the appropriateness of the routing of the optical fiber 103 in the electronic device 100A on the basis of the obtained bending amount (curvature radius R) of the optical fiber 103.

The display unit 207 displays information including the determination result of the appropriateness of the routing of the optical fiber 103 for the electronic device 100A in the determination unit 206 (see FIG. 19). This information may further include the bending amount (=curvature radius) of the optical fiber 103 for the electronic device 100A or the bending margin of the optical fiber 103 in addition to the determination result.

The control unit 208 controls the operations of the determination unit 206 and the display unit 207. When it is determined that the measuring device 200A has started receiving the optical signal outputted with the second wavelength from the electronic device 100A in the test mode, the control unit 208 starts the operations of the determination unit 206 and the display unit 207.

By monitoring the outputs of the electric conversion units 204 and 205 into the determination unit 206, the control unit 208 determines whether the measuring device 200A has started receiving the optical signal outputted with the second wavelength from the electronic device 100A in the test mode. The process is not limited thereto regarding the determination on whether the measuring device 200A has started receiving the optical signal outputted with the second wavelength from the electronic device 100A in the test mode.

As described above, the operations of the determination unit 206 and the display unit 207 are started when the measuring device 200A has started receiving the optical signal outputted with the second wavelength from the electronic device 100A in the test mode. Thus, the determination unit 206 and the display unit 207 operate efficiently, achieving lower power consumption.

Instead of starting the operations of the determination unit 206 and the display unit 207 when it is determined that the measuring device 200A has started receiving the optical signal outputted with the second wavelength from the electronic device 100A in the test mode, as will be described later, the control unit 208 may start the operations of the determination unit 206 and the display unit 207 in response to a user operation for providing an instruction to start measurement. In this case, the determination unit 206 and the display unit 207 are operated after a user operation for providing an instruction to start measurement, achieving efficient operations with lower power consumption.

In response to a user operation for providing an instruction to start measurement, the control unit 208 starts transmitting a signal indicating start to the optical conversion unit 209. Thus, the optical conversion unit 209 starts outputting an optical signal indicating the start into the optical connector 201 through the wavelength selection filter 210. The optical signal is transmitted to the electronic device 100A through the cable 300. For example, a user operation for providing an instruction to start is performed on the basis of an external input, that is, an input operation of a start instruction signal to the control unit 208 from a connector connected to the device's exterior.

Thereafter, when the reception of the optical signal outputted with the second wavelength from the electronic device 100A in the test mode is started, the control unit 208 terminates the transmission of the signal indicating start to the optical conversion unit 209. Thus, the optical conversion unit 209 terminates the output of the optical signal indicating the start into the optical connector 201 through the wavelength selection filter 210. In this case, the optical signal indicating the start is prevented from being excessively outputted from the optical conversion unit 209, thereby reducing power consumption.

In response to a user operation for providing an instruction to terminate measurement in a state in which the optical signal outputted with the second wavelength in the test mode from the electronic device 100A is received, that is, in a state in which the determination unit 206 and the display unit 207 operate, the control unit 208 terminates the operations of the determination unit 206 and the display unit 207 and transmits a signal indicating termination to the optical conversion unit 209.

Thus, the optical conversion unit 209 outputs the optical signal indicating termination into the optical connector 201 through the wavelength selection filter 210. The optical signal is transmitted to the electronic device 100A through the cable 300. The user operation for providing an instruction to terminate measurement is performed like the user operation for providing an instruction to start measurement. The detailed description thereof is omitted.

Instead of terminating the operations of the determination unit 206 and the display unit 207 in response to a user operation for providing an instruction to terminate measurement, the control unit 208 may terminate the operations of the determination unit 206 and the display unit 207 when the determination unit 206 and the display unit 207 terminate the series of operations after the reception of the optical signal outputted with the second wavelength from the electronic device 100A in the test mode.

Figure 23:
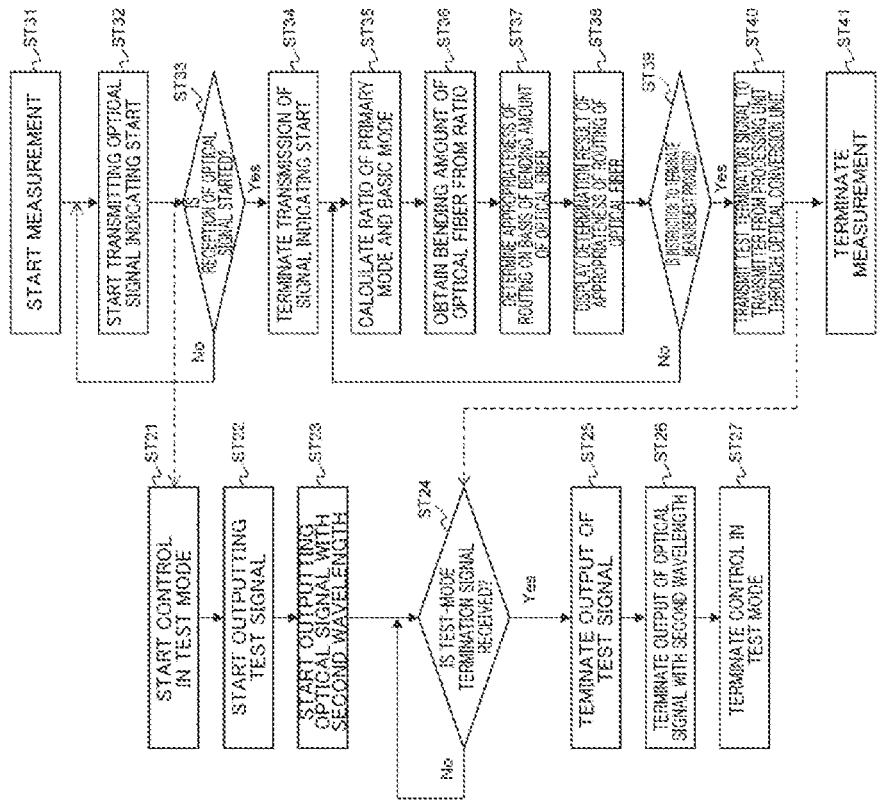
FIG. 23 shows an example of steps for a test mode in the electronic device and steps in a measuring device.

The flowchart of FIG. 23 shows an example of steps for the test mode in the electronic device 100A and steps in the measuring device 200A.

First, the steps for the test mode in the electronic device 100A will be described below. In step ST21, the control unit 121 first starts control in the test mode on the basis of the reception of the test-mode start signal from the electric conversion unit 105.

In step ST22, the signal generation unit 122 starts outputting a test signal in a predetermined pattern to the optical conversion unit 104 on the basis of the control of the control unit 121.

In step ST23, the optical conversion unit 104 starts outputting the optical signal with the second wavelength on the basis of the control of the control unit 121, the optical signal corresponding to the test signal. The optical signal is inputted to the optical fiber 103 through the wavelength selection filter 106, is propagated through the optical fiber 103, and is outputted from the optical connector 101. The optical signal outputted with the second wavelength from the optical connector 101 includes the primary mode, which is generated at a bend of the fiber, in addition to the basic mode.

In step ST24, the control unit 121 determines whether the test-mode termination signal has been received from the electric conversion unit 105. When it is determined that the test-mode termination signal has been received, in step ST25, the signal generation unit 122 terminates the output of the test signal in the predetermined pattern to the optical conversion unit 104 on the basis of the control of the control unit 121.

In step ST26, the optical conversion unit 104 terminates the output of the optical signal with the second wavelength on the basis of the control of the control unit 121, the optical signal corresponding to the test signal. In step ST27, the control unit 121 terminates control in the test mode.

The steps in the measuring device 200A will be described below. First, in step ST31, the control unit 208 starts measurement in response to a user operation for providing an instruction to start measurement. In step ST32, the control unit 208 starts outputting a signal indicating start to the optical conversion unit 209 and then starts outputting the optical signal indicating start from the optical conversion unit 209 to transmit the signal to the electronic device 100A.

In step ST33, it is determined whether the reception of the optical signal outputted with the second wavelength from the electronic device 100A in the test mode has been started. When the reception is started, in step ST34, the control unit 208 terminates the output of the signal indicating start to the optical conversion unit 209. This terminates the output and transmission of the optical signal indicating the start from the optical conversion unit 209 to the electronic device 100A.

In step ST35, the determination unit 206 calculates the level ratio of the output of the electric conversion unit 204 and the output of the electric conversion unit 205 as the ratio of the amount of the primary mode component and the amount of the basic mode component.

In step ST36, the determination unit 206 obtains the bending amount (curvature radius R) of the optical fiber 103 of the electronic device 100A from the ratio calculated in step ST35. In this case, the determination unit 206 converts the ratio calculated in step ST35 into a bending amount (curvature radius R) on the basis of the relationship information (see FIGS. 17 and 18) about the bending amount of the optical fiber and the ratio of the amount of the primary mode component and the amount of the basic mode component.

In step ST37, the determination unit 206 determines the appropriateness of the routing of the optical fiber 103 in the electronic device 100A on the basis of the bending amount (curvature radius R) obtained in step ST36. In this case, if the bending amount obtained in step ST36 is smaller than the bending amount of the judgement point, the determination unit 206 determines that the routing is not appropriate (=NG). If the bending amount obtained in step ST36 is equal to or larger than the judgement point, the determination unit 206 determines that the routing is appropriate (=OK).

In step ST38, the display unit 207 displays information including the determination result of the appropriateness of the routing of the optical fiber 103 for the electronic device 100A in the determination unit 206 (see FIG. 19).

In step ST39, the control unit 208 determines the presence or absence of a user operation for providing an instruction to terminate measurement. In the absence of an operation for providing an instruction to terminate measurement, the process returns to the processing of step ST35 to repeatedly perform the same processing.

In the presence of an operation for providing an instruction to terminate measurement, in step ST40, the control unit 208 outputs a signal indicating termination to the optical conversion unit 209 and then outputs the optical signal indicating termination from the optical conversion unit 209 to transmit the signal to the electronic device 100A. In step ST41, the control unit 208 terminates measurement.

In the steps in the measuring device 200A, the display unit 207 displays, for example, the determination result of the appropriateness of the routing of the optical fiber 103 in step ST38, and then the flow of steps ST35 to ST38 is repeated until a user operation is performed for providing an instruction to terminate measurement. After the processing of step ST38, the process may immediately advance to the processing of step ST40 on the assumption that the series of measurement is completed.

In the system example illustrated in FIG. 21, the measuring device 200A is configured like the measuring device 200 illustrated in FIG. 16, achieving the same effect. Moreover, in the system example illustrated in FIG. 21, the electronic device 100A is configured like the electronic device 100 illustrated in FIG. 16, achieving the same effect.

2. Modification Example

The foregoing embodiments described examples in which the bending amount of the optical fiber 103 is measured, the optical fiber 103 being routed in the electronic devices 100 and 100A. However, the present technique is not limited to the measurement of the bending amount of the optical fiber routed in the electronic device.

Figure 24:
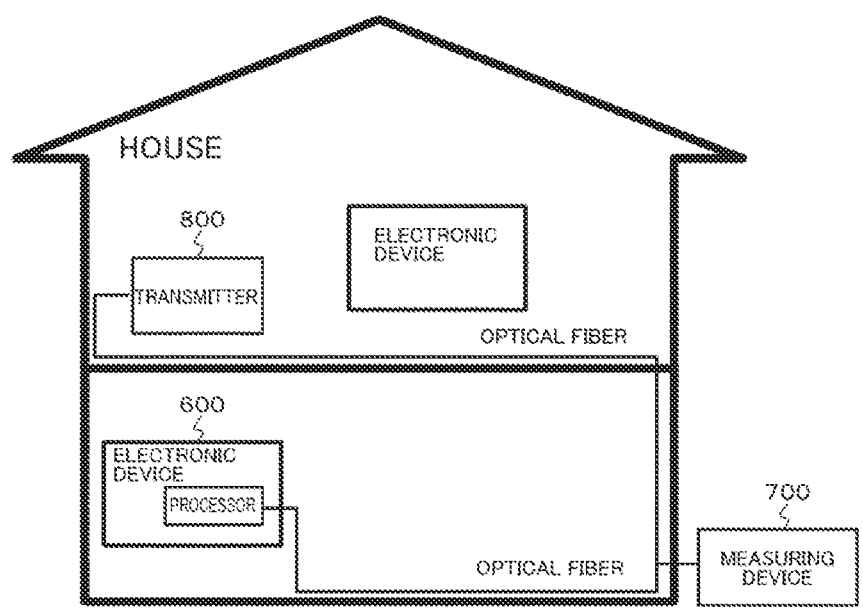
FIG. 24 is an explanatory drawing of an example in which an optical fiber for measuring a bending amount is an optical fiber of indoor wiring.

For example, as illustrated in FIG. 24, the present technique is also applicable to indoor (house) wiring or the like. For example, if an electronic device 600, e.g., a television receiver has the function of transmitting an optical signal with a second wavelength as described in the foregoing embodiments such that the optical signal corresponds to a test signal, allowing the measuring device 700 to measure the bending amount of an optical fiber by a combination of wiring in the electronic device and indoor wiring. If only the bending amount of indoor wiring is to be measured, a transmitter 800 is prepared with the function of transmitting an optical signal with a second wavelength as described in the foregoing embodiments such that the optical signal corresponds to a test signal, allowing the measuring device 700 to measure only the bending amount of indoor wiring.

Furthermore, the foregoing embodiments described examples in which the measuring devices 200 and 200A each obtain the bending amount of the optical fiber 103 by using the ratio of the amount of the primary mode component included in the optical signal transmitted with the second wavelength from the electronic devices 100 and 100A and the amount of the basic mode component included in the optical signal with the second wavelength. The method for obtaining the bending amount of the optical fiber 103 on the basis of the amount of the primary mode component is not limited thereto.

For example, if the power of the optical signal inputted with the second wavelength to the optical fiber 103 is identified in the electronic devices 100 and 100A, the optical signal corresponding to the test signal, the measuring devices 200 and 200A can obtain the bending amount of the optical fiber 103 by using the coupling efficiency of the primary mode (see FIG. 12), the coupling efficiency being calculated from the power of the primary mode component included in the optical signal transmitted with the second wavelength from the electronic devices 100 and 100A.

Moreover, in the foregoing embodiments, the first wavelength is 1310 nm. Since a laser light source or an LED light source may be used as a light source, the first wavelength is assumed to be, for example, 300 nm to 5 μm.

Furthermore, in the foregoing embodiments, the first wavelength is 1310 nm. The first wavelength may be a wavelength of a 1310-nm range including 1310 nm.

Moreover, in the foregoing embodiments, the first wavelength is 1310 nm. The first wavelength may be 1550 nm or a wavelength of a 1550-nm range including 1550 nm.

Furthermore, in the foregoing embodiments, the second wavelength is 850 nm. The second wavelength may be a wavelength of a 850-nm range including 850 nm.

The foregoing embodiments described examples in which the optical waveguide is an optical fiber. Naturally, the present technique is similarly applicable to, for example, a silicon optical waveguide.

Although the preferred embodiments of the present disclosure have been described in detail with reference to the accompanying figures, the technical scope of the present disclosure is not limited to such examples. It is apparent that those having ordinary knowledge in the technical field of the present disclosure could conceive various modifications or revisions within the scope of the technical ideas set forth in the claims, and it should be understood that these also naturally fall within the technical scope of the present disclosure.

Furthermore, the effects described in the present specification are merely explanatory or exemplary and are not intended as limiting. In other words, the technique according to the present disclosure may exhibit other effects apparent to those skilled in the art from the description herein, in addition to or in place of the above effects.

The present technique can also have the following configurations:

(1) A measuring device including a light receiving unit that receives an optical signal outputted with a second wavelength from an optical waveguide, wherein the optical waveguide allows propagation only in a basic mode at a first wavelength, and the second wavelength is a wavelength where the optical waveguide allows propagation at least in a primary mode in addition to the basic mode, the measuring device further including a processing unit that performs processing for obtaining a bending amount of the optical waveguide on the basis of the amount of a component of the primary mode, the component being included in the optical signal with the second wavelength.

(2) The measuring device according to (1), wherein the processing unit obtains the bending amount of the optical waveguide by using the ratio of the amount of the primary mode component included in the optical signal with the second wavelength and the amount of a basic mode component included in the optical signal with the second wavelength.

(3) The measuring device according to (2), wherein the processing unit includes: a mode separation unit that separates the primary mode component and the basic mode component from the second wavelength;

a first electric conversion unit that converts the primary mode component into an electric signal, the primary mode component being separated by the mode separation unit;

a second electric conversion unit that converts the basic mode component into an electric signal, the basic mode component being separated by the mode separation unit;

an arithmetic unit that determines the level ratio of the output of the first electric conversion unit and the output of the second electric conversion unit as the ratio of the amount of the primary mode component and the amount of the basic mode component; and a conversion unit that converts the ratio determined by the arithmetic unit into a bending amount of the optical waveguide on the basis of relationship information about the bending amount of the optical waveguide and the ratio of the amount of the primary mode component and the amount of the basic mode component.

(4) The measuring device according to any one of (1) to (3), wherein the processing unit starts processing when the light receiving unit starts receiving the optical signal with the second wavelength.

(5) The measuring device according to (4), wherein the processing unit terminates the processing when the light receiving unit terminates the reception of the optical signal with the second wavelength.

(6) The measuring device according to any one of (1) to (5), further including a light transmitting unit that inputs, to the optical waveguide, an optical signal indicating start.

(7) The measuring device according to (6), wherein the light transmitting unit starts inputting the optical signal indicating the start, to the optical waveguide on the basis of a user instruction operation.

(8) The measuring device according to (6) or (7), wherein the light transmitting unit terminates the input of the optical signal indicating the start to the optical waveguide when the light receiving unit starts receiving the optical signal with the second wavelength.
(9) The measuring device according to any one of (6) to (8), wherein the light transmitting unit further inputs, to the optical waveguide, an optical signal indicating termination when the processing of the processing unit is terminated in a state in which the light receiving unit has received the optical signal with the second wavelength.
(10) The measuring device according to (9), wherein the processing unit terminates processing automatically at the completion of the series of operations or on the basis of a user instruction operation.
(11) The measuring device according to any one of (1) to (10), further including a determination unit that determines the appropriateness of the routing of the optical waveguide on the basis of the bending amount of the optical waveguide, the bending amount being obtained by the processing unit.
(12) The measuring device according to (11), wherein the determination unit determines the appropriateness of the routing of the optical waveguide on the basis of whether the bending amount of the optical waveguide is equal to or larger than a bending amount with a certain margin from a bending amount that rapidly reduces coupling efficiency, the processing unit obtaining the bending amount of the optical waveguide.
(13) The measuring device according to claim 11 or 12, further including a display unit that displays information including the determination result of the determination unit.
(14) The measuring device according to (13), wherein the information includes the bending amount of the optical waveguide and/or the bending margin of the optical waveguide, the bending amount being obtained by the processing unit.
(15) A measuring method including: receiving an optical signal outputted with a second wavelength from an optical waveguide,
wherein the optical waveguide allows propagation only in a basic mode at a first wavelength, and
the second wavelength is a wavelength where the optical waveguide allows propagation at least in a primary mode in addition to the basic mode,
the method further including receiving the optical signal with the second wavelength where the optical waveguide allows propagation at least in a primary mode in addition to the basic mode, the optical signal being outputted from the optical waveguide that allows propagation only in the basic mode at the first wavelength; and
performing processing for obtaining a bending amount of the optical waveguide on the basis of the amount of a component of the primary mode, the component being included in the optical signal with the second wavelength.
(16) An electronic device including an optical connector,
wherein one end of an optical waveguide is connected to the optical connector, and the optical waveguide is configured to
allow propagation only in a basic mode at a first wavelength and
perform communications using light with a second wavelength where the optical waveguide allows propagation at least in a primary mode in addition to the basic mode, the electronic device further including a light transmitting unit that inputs an optical signal having only the basic mode with the second wavelength to the other end of the optical waveguide.
(17) The electronic device according to (16), wherein the light transmitting unit starts inputting the optical signal having only the basic mode with the second wavelength to the other end of the optical waveguide on the basis of a user instruction operation.
(18) The electronic device according to (17), wherein the light transmitting unit terminates the input of the optical signal having only the basic mode with the second wavelength to the other end of the optical waveguide on the basis of a user instruction operation.
(19) The electronic device according to (16), wherein the light transmitting unit starts inputting the optical signal having only the basic mode with the second wavelength to the other end of the optical waveguide when an optical signal indicating start is outputted from the other end of the optical waveguide.
(20) The electronic device according to (19), wherein the light transmitting unit terminates the input of the optical signal having only the basic mode with the second wavelength to the other end of the optical waveguide when an optical signal indicating termination is outputted from the other end of the optical waveguide.

REFERENCE SIGNS LIST 10T, 10R Optical fiber
10a Core
10b Clad
11T, 11R Lens
100, 100A Electronic device
101 Optical connector
102 Processor
103 Optical fiber
104 Optical conversion unit
105 Electric conversion unit
106 Wavelength selection filter
121 Control unit
122 Signal generation unit
200, 200A Measuring device
201 Optical connector
202 Optical fiber
203 Volume hologram
204, 205 Electric conversion unit
206 Determination unit
207 Display unit
208 Control unit
209 Optical conversion unit
210 Wavelength selection filter
300 Cable
301 Optical fiber
302, 303 Optical connector

The invention claimed is:
1. A measuring device, comprising:
an optical connector configured to:
  receive an optical signal outputted with a second wavelength from an optical waveguide, wherein
    the optical waveguide allows propagation only in a basic mode at a first wavelength, and
    the second wavelength is a wavelength where the optical waveguide allows propagation in at least one of a primary mode or the basic mode; and input, to the optical waveguide, an optical signal indicating start and an optical signal indicating termination; and
a processing unit configured to perform a process to obtain a bending amount of the optical waveguide, wherein
the bending amount is obtained based on an amount of a primary mode component of the primary mode,
the primary mode component is included in the optical signal with the second wavelength, and
the input of the optical signal indicating the termination is based on the process that is terminated in a state in which the optical connector has received the optical signal with the second wavelength.

2. The measuring device according to claim 1, wherein the processing unit is further configured to obtain the bending amount of the optical waveguide by use of a ratio of an amount of the primary mode component included in the optical signal with the second wavelength and an amount of a basic mode component, of the basic mode, included in the optical signal with the second wavelength.

3. The measuring device according to claim 2, wherein the processing unit comprises:
a mode separation unit configured to separate the primary mode component and the basic mode component from the optical signal with the second wavelength;
a first electric conversion unit configured to convert the primary mode component into an electric signal;
a second electric conversion unit configured to convert the basic mode component into an electric signal;
an arithmetic unit configured to determine a level ratio of an output of the first electric conversion unit and an output of the second electric conversion unit as a ratio of the amount of the primary mode component and the amount of the basic mode component; and
a conversion unit configured to convert the level ratio determined by the arithmetic unit into the bending amount of the optical waveguide, wherein the conversion is based on
relationship information about the bending amount of the optical waveguide, and
the ratio of the amount of the primary mode component and the amount of the basic mode component.

4. The measuring device according to claim 1, wherein the processing unit is further configured to start the process based on start of the reception of the optical signal with the second wavelength.

5. The measuring device according to claim 4, wherein the processing unit is further configured to terminate the process based on termination of the reception of the optical signal with the second wavelength.

6. The measuring device according to claim 1, wherein the optical connector is further configured to input, based on a user instruction operation, the optical signal indicating the start to the optical waveguide.

7. The measuring device according to claim 1, wherein the optical connector is further configured to terminate the input of the optical signal indicating the start to the optical waveguide, based on start of the reception of the optical signal with the second wavelength.

8. The measuring device according to claim 1, wherein the processing unit is further configured to terminate the process automatically one of at completion of a series of operations or based on a user instruction operation.

9. The measuring device according to claim 1, further comprising a determination unit configured to determine appropriateness of routing of the optical waveguide based on the bending amount of the optical waveguide.

10. The measuring device according to claim 9, wherein the determination unit is further configured to determine the appropriateness of the routing of the optical waveguide based on whether the bending amount of the optical waveguide is equal to or larger than a bending amount with a certain margin from a bending amount that rapidly reduces coupling efficiency.

11. The measuring device according to claim 9, further comprising
a display unit configured to display information including a result of the determination by the determination unit.

12. The measuring device according to claim 11, wherein the information includes at least one of the bending amount of the optical waveguide or a bending margin of the optical waveguide.

13. A measuring method, comprising:
receiving an optical signal outputted with a second wavelength from an optical waveguide, wherein
the optical waveguide allows propagation only in a basic mode at a first wavelength, and
the second wavelength is a wavelength where the optical waveguide allows propagation in at least one of a primary mode or the basic mode;
inputting, to the optical waveguide, an optical signal indicating start and an optical signal indicating termination; and
performing processing for obtaining a bending amount of the optical waveguide, wherein
the bending amount is obtained based on an amount of a primary mode component of the primary mode,
the primary mode component is included in the optical signal with the second wavelength, and
the input of the optical signal indicating the termination is based on the processing that is terminated in a state in which the optical signal with the second wavelength is received.

14. An electronic device, comprising:
an optical waveguide;
an optical connector, wherein
a first end of the optical waveguide is connected to the optical connector, and
the optical waveguide is configured to:
allow propagation only in a basic mode at a first wavelength; and
perform communications using light with a second wavelength where the optical waveguide allows propagation in at least one of a primary mode or the basic mode; and
an optical conversion unit configured to:
input an optical signal having only the basic mode with the second wavelength to a second end of the optical waveguide, based on an optical signal indicating start outputted from the second end of the optical waveguide, and
terminate the input of the optical signal having only the basic mode with the second wavelength to the second end of the optical waveguide based on an optical signal indicating termination outputted from the second end of the optical waveguide.

15. The electronic device according to claim 14, wherein the optical conversion unit is further configured to start the input of the optical signal having only the basic mode with the second wavelength to the second end of the optical waveguide based on a user instruction operation.

16. The electronic device according to claim 14, wherein the optical conversion unit is further configured to terminate the input of the optical signal having only the basic mode with the second wavelength to the second end of the optical waveguide based on a user instruction operation.

\* \* \* \* \*